United States Patent
Yuki et al.

(10) Patent No.: US 9,113,173 B2
(45) Date of Patent: Aug. 18, 2015

(54) DATA PROCESSING DEVICE AND DATA PROCESSING METHOD WHICH COMPRESSES IMAGE DATA

(75) Inventors: Yasuhiro Yuki, Osaka (JP); Kento Ogawa, Osaka (JP); Shohji Ohtsubo, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 878 days.

(21) Appl. No.: 13/320,822

(22) PCT Filed: Mar. 10, 2011

(86) PCT No.: PCT/JP2011/001406
§ 371 (c)(1),
(2), (4) Date: Nov. 16, 2011

(87) PCT Pub. No.: WO2011/114668
PCT Pub. Date: Sep. 22, 2011

(65) Prior Publication Data
US 2012/0057802 A1 Mar. 8, 2012

(30) Foreign Application Priority Data
Mar. 18, 2010 (JP) ................. 2010-062954

(51) Int. Cl.
*H04N 19/102* (2014.01)
*H04N 19/134* (2014.01)
(Continued)

(52) U.S. Cl.
CPC ............ *H04N 19/59* (2014.11); *H04N 19/115* (2014.11); *H04N 19/136* (2014.11); *H04N 19/17* (2014.11); *H04N 19/46* (2014.11)

(58) Field of Classification Search
None
See application file for complete search history.

(56) References Cited

U.S. PATENT DOCUMENTS 5,960,126 A * 9/1999 Nielsen et al. ................ 382/298
6,008,860 A 12/1999 Patton et al.
(Continued)

FOREIGN PATENT DOCUMENTS

CN 1406072 3/2003
CN 1679328 10/2005
(Continued)

OTHER PUBLICATIONS

Crandall, D.—"Extraction of special effects caption text events from digital video"—IJDAR 2003, pp. 138-157.*
(Continued)

*Primary Examiner* — Bernard Krasnic
(74) *Attorney, Agent, or Firm* — Wenderoth, Lind & Ponack, L.L.P.

(57) ABSTRACT

A data processing device includes an input unit which acquires image data, a meaning information extraction unit which extracts meaning information indicating a feature of an object image included in an image represented by the image data, a compression specifying unit which determines an initial value of a compression ratio, a compression unit which compresses the image data according to the compression ratio to generate compressed image data, and a determination unit which determines whether or not the meaning information can be extracted from the compressed image data. The compression specifying unit further changes the compression ratio from the initial value according to a result of the determination by the determination unit, and when the compression ratio is changed, the compression unit further compresses the image data according to the changed compression ratio to newly generate compressed image data.

17 Claims, 27 Drawing Sheets

(51) Int. Cl.
*H04N 19/59* (2014.01)
*H04N 19/46* (2014.01)
*H04N 19/115* (2014.01)
*H04N 19/136* (2014.01)
*H04N 19/17* (2014.01)

(56) References Cited

U.S. PATENT DOCUMENTS

| | | | |
|---|---|---|---|
| 6,137,914 A * | 10/2000 | Ligtenberg et al. | 382/240 |
| 6,449,639 B1 * | 9/2002 | Blumberg | 709/217 |
| 6,708,309 B1 * | 3/2004 | Blumberg | 715/209 |
| 6,956,974 B1 * | 10/2005 | Ito et al. | 382/240 |
| 7,609,301 B2 | 10/2009 | Kaku | |
| 2006/0023957 A1 | 2/2006 | Ito | |
| 2006/0088191 A1 * | 4/2006 | Zhang et al. | 382/107 |
| 2006/0153539 A1 | 7/2006 | Kaku | |
| 2006/0157012 A1 * | 7/2006 | Kanno | 123/90.17 |
| 2008/0253068 A1 | 10/2008 | Hisatsune | |
| 2009/0161170 A1 | 6/2009 | Harada | |
| 2009/0196462 A1 * | 8/2009 | Sharoni et al. | 382/103 |
| 2009/0323803 A1 | 12/2009 | Gomila et al. | |
| 2011/0243470 A1 * | 10/2011 | Noguchi | 382/239 |
| 2012/0188286 A1 * | 7/2012 | Groth et al. | 345/670 |

FOREIGN PATENT DOCUMENTS

| | | |
|---|---|---|
| CN | 1852438 | 10/2006 |
| CN | 101383927 | 3/2009 |
| CN | 101895787 | 11/2010 |
| JP | 7-95395 | 4/1995 |
| JP | 2002-135600 | 5/2002 |
| JP | 2004-295723 | 10/2004 |
| JP | 2005-109606 | 4/2005 |
| JP | 2006-50096 | 2/2006 |
| JP | 2007-513413 | 5/2007 |
| JP | 2007-288415 | 11/2007 |
| JP | 2007-324856 | 12/2007 |
| JP | 2008-242694 | 10/2008 |
| JP | 2008-262494 | 10/2008 |
| JP | 2009-27385 | 2/2009 |
| JP | 2009-49976 | 3/2009 |
| JP | 2009-290819 | 12/2009 |
| JP | 2009-296266 | 12/2009 |
| JP | 2010-56946 | 3/2010 |
| WO | 2005/052850 | 6/2005 |
| WO | 2009/014156 | 1/2009 |

OTHER PUBLICATIONS

International Search Report issued Apr. 19, 2011 in corresponding International Application No. PCT/JP2011/001406.
Office Action issued Aug. 7, 2014 in corresponding Chinese Application No. 201180002078.1 (with partial English translation).
Extended European Search Report issued Mar. 20, 2015 in corresponding European Application No. 11755861.9.
Yan YE et al., "Fast and Memory Efficient Text Image Compression With JBIG2", IEEE Transactions on Image Processing, IEEE Service Center, Piscataway, NJ, US, vol. 12, No. 8, Aug. 1, 2003, pp. 944-956, XP011099242, ISSN: 1057-7149, DOI: 10.1109/TIP.2003.815253.
Qi MA et al., "Saliency-Based Image Quality Assessment Criterion", In: Huang D-S et al., "Advanced Intelligent Computing Theories and Applications. With Aspects of Theoretical and Methodological Issues (Lecture Notes in Computer Science)", Sep. 15, 2008, Springer, XP019105590, ISBN: 978-3-540-87440-9, vol. 5226, DOI: 10.1007/978-3-540-87442-3_139.
Marius Pedersen et al., "Survey of full-reference image quality metrics", Høgskolen I Gjøviks Rapportserie, The Norwegian Color Research Laboratory (Gjøvik University College), No. 5, Jul. 1, 2009, pp. 1-73, XP055032257.

* cited by examiner

| Compression policy level | 1 | 2 | 3 | 4 | 5 |
|---|---|---|---|---|---|
| Presence of meaning information (e.g., Face image extracted) | False | True | True | True | True |
| Area proportion | N/A | Large | Large | Small | Small |
| Number of items of meaning information | N/A | Few | Many | Few | Many |
| Compression ratio (%) | 20 | 40 | 60 | 80 | 100 |

| Parameter | Threshold |
|---|---|
| Small | value ≤ 20% |
| Large | 20% < value |
| Few | value < 2 |
| Many | 2 ≤ value |

FIG. 7

| Compression policy level | 1 | 2 | 3 | 4 | 5 |
|---|---|---|---|---|---|
| Compression ratio (%) | 20 | 40 | 60 | 80 | 100 |
| Image name before processing | A-1 | A-2 | A-3 | A-4 | A-5 |
| Size before processing (w × h) | 4000 × 3000 | 4000 × 3000 | 4000 × 3000 | 4000 × 3000 | 4000 × 3000 |
| Image before processing [A] | | | | | |
| Image name after processing | B-1 | B-2 | B-3 | B-4 | B-5 |
| Size after processing (w × h) | 800 × 600 | 1600 × 1200 | 2400 × 1800 | 3200 × 2400 | 4000 × 3000 |
| Image after processing [B] | | | | | |

FIG. 9

| ID | Data name | Extension | Type | Presence of meaning information | MID | Focus | Meaning information type | Coordinate X | Coordinate Y | Width W | Height H | Compression ratio |
|---|---|---|---|---|---|---|---|---|---|---|---|---|
| 1 | A-1 | jpg | Image | false | - | - | - | - | - | - | - | 20 |
| 2 | A-2 | jpg | Image | true | 1 | 1 | human | 1254 | 453 | 334 | 365 | 40 |
| 3 | A-3 | jpg | Image | true | 1 | 0 | human | 878 | 487 | 201 | 230 | 63 |
| | | | | | 2 | 0 | human | 1032 | 493 | 133 | 144 | |
| | | | | | 3 | 0 | human | 1781 | 563 | 158 | 150 | |
| | | | | | 4 | 0 | human | 2412 | 488 | 150 | 161 | |
| | | | | | 5 | 1 | human | 3103 | 572 | 213 | 217 | |
| 4 | A-4 | jpg | Image | true | 1 | 1 | human | 1998 | 1378 | 40 | 38 | 91 |
| 5 | A-5 | jpg | Image | true | 1 | 0 | human | 976 | 1486 | 35 | 31 | 100 |
| | | | | | 2 | 1 | human | 2219 | 1473 | 38 | 32 | |
| | | | | | 3 | 0 | human | 2874 | 1477 | 30 | 28 | |
| ⋮ | ⋮ | ⋮ | ⋮ | ⋮ | ⋮ | ⋮ | ⋮ | ⋮ | ⋮ | ⋮ | ⋮ | ⋮ |

FIG. 12

| Compression policy level | 1 | 2 | 3 | 4 | 5 |
|---|---|---|---|---|---|
| Original compression ratio (%) | 20 | 40 | 60 | 80 | 100 |
| Changed compression ratio (%) | 20 | 40 | 63 | 91 | 100 |
| Image name before processing | A-1 | A-2 | A-3 | A-4 | A-5 |
| Size before processing (w x h) | 4000 x 3000 | 4000 x 3000 | 4000 x 3000 | 4000 x 3000 | 4000 x 3000 |
| Image before processing [A] | | | | | |
| Image name after processing | C-1 | C-2 | C-3 | C-4 | C-5 |
| Size after processing (w x h) | 800 x 600 | 1600 x 1200 | 2520 x 1890 | 3640 x 2730 | 4000 x 3000 |
| Image after processing [C] | | | | | |

| ID | Name | Type | Type | |
|----|------|------|------|---|
| 1 | IMG_0001 | jpg | Image | |
| 2 | IMG_0002 | jpg | Image | |
| 3 | IMG_0003 | jpg | Image | |
| ... | ... | ... | ... | |
| n | IMG_000n | ※ | ※ | |

FIG. 17

| ID | Meaning information type | Name | Number of data registrations |
|---|---|---|---|
| 1 | human | Mike | 102 |
| 2 | human | Julia | 79 |
| 3 | human | Tom | 53 |
| 4 | human | Paul | 51 |
| 5 | human | James | 42 |
| 6 | human | Dan | 48 |
| 7 | human | John | 36 |
| ... | ... | ... | ... |

FIG. 18

| ID | Data name | Extension | Type | Presence of meaning information | MID | Focus | Meaning information type | Registered similar person | Similarity (%) |
|---|---|---|---|---|---|---|---|---|---|
| 1 | A-1 | jpg | Image | false | - | - | - | - | - |
| 2 | A-2 | jpg | Image | true | 1 | 1 | human | Mike | 67 |
| 3 | A-3 | jpg | Image | true | 1 | 0 | human | Tom | 71 |
|  |  |  |  |  | 2 | 0 | human | John | 29 |
|  |  |  |  |  | 3 | 1 | human | Julia | 88 |
|  |  |  |  |  | 4 | 0 | human | Paul | 23 |
|  |  |  |  |  | 5 | 0 | human | Mike | 76 |
| 4 | A-4 | jpg | Image | true | 1 | 1 | human | Julia | 47 |
| 5 | A-5 | jpg | Image | true | 1 | 1 | human | Julia | 56 |
|  |  |  |  |  | 2 | 0 | human | (unknown) | 0 |
|  |  |  |  |  | 3 | 0 | human | Mike | 36 |
| ... | ... | ... | ... | ... | ... | ... | ... | ... | ... |

FIG. 21

| ID | Meaning information type | Name | Number of data registrations | Rank |
|---|---|---|---|---|
| 1 | human | Mike | 102 | 1 |
| 2 | human | Julia | 79 | 2 |
| 3 | human | Tom | 53 | 7 |
| 4 | human | Paul | 51 | 10 |
| 5 | human | James | 42 | 13 |
| 6 | human | Dan | 22 | 28 |
| 7 | human | John | 13 | 57 |
| ... | ... | ... | ... | ... |

FIG. 24
| Compression policy level | 1 | 2 | 3 | 4 | 5 |
|---|---|---|---|---|---|
| Original compression ratio (%) | 20 | 40 | 60 | 80 | 100 |
| Changed compression ratio (%) | 20 | 60 | 80 | 100 | 100 |
| Image name before processing | A-1 | A-2 | A-3 | A-4 | A-5 |
| Size before processing (w × h) | 4000 × 3000 | 4000 × 3000 | 4000 × 3000 | 4000 × 3000 | 4000 × 3000 |
| Image before processing [A] | 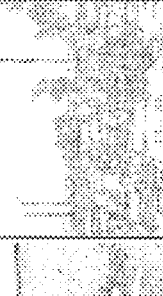 | 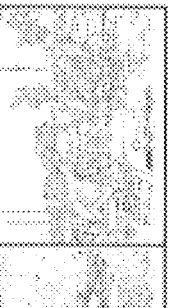 | 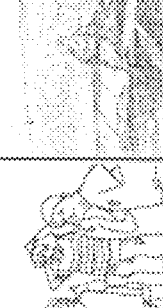 | 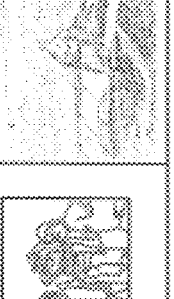 |  |
| Image name after processing | D-1 | D-2 | D-3 | D-4 | D-5 |
| Size after processing (w × h) | 800 × 600 | 2400 × 1600 | 3200 × 2400 | 4000 × 3000 | 4000 × 3000 |
| Image after processing [D] | 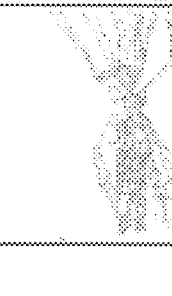 | 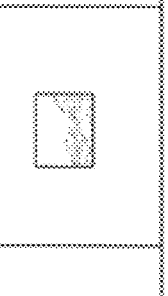 | 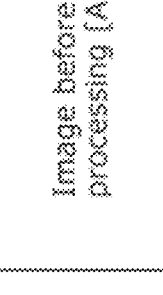 | 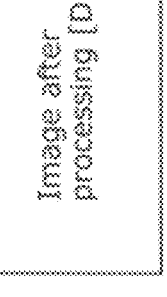 |  |

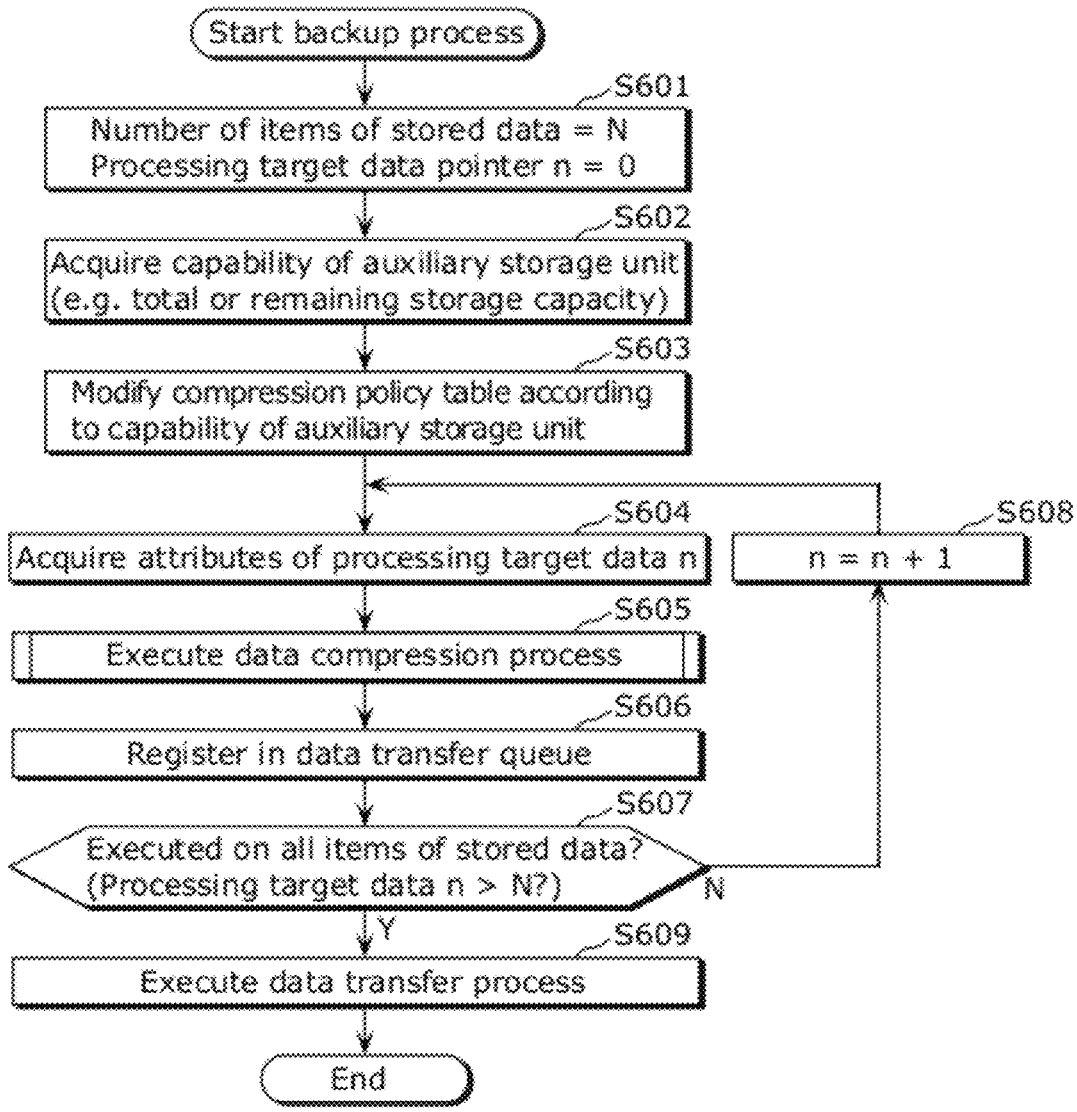

FIG. 30

|  | Data storage unit (backup source) | First external device (backup destination) | Second external device (backup destination) | Third external device (backup destination) |
|---|---|---|---|---|
| Device type | Storage Device | Storage Device | Online Storage | Mobile Device |
| Volume label | Local | Remote A | Remote B | Remote C |
| Total storage capacity | 2,000 GB | 2,000 GB | 500 GB | 100 GB |
| Remaining storage capacity | 1,000 GB | 2,000 GB | 500 GB | 80 GB |
| Number of items of stored data | 50,000 | 0 | 0 | 0 |
| Maximum write data size | 2 GB | 2 GB | 1 GB | 2 GB |
| Line transmission rate | 100 Mbps | 50 Mbps | 12 Mbps | 54/7.2 Mbps |
| Recommended communication time period | — | 0:00 - 10:00 | 0:00 - 5:00 | — |
| Trend in communication congestion | — | — | 10:00 - 22:00 | — |
| Screen size | 3840 × 2160 | 1920 × 1080 | — | 320 × 480 |
| Resolution (ppi) | 240 | 95.8 | — | 160 |
| Movie reproduction frame rate | 60 fps | 30 fps | — | 24 fps |
| ⋮ | ⋮ | ⋮ | ⋮ | ⋮ |

FIG. 32
(a)
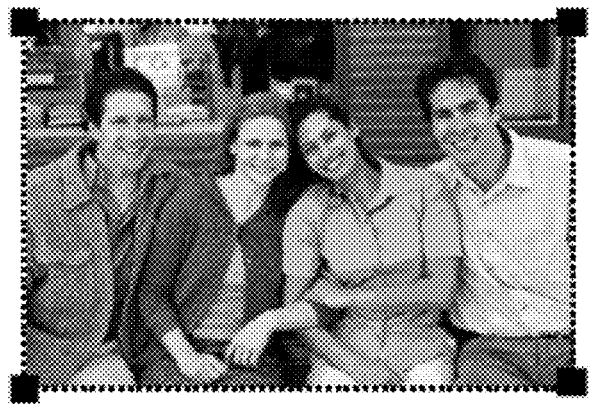
(b)
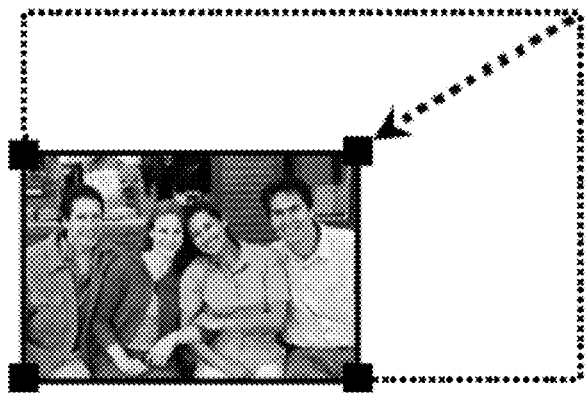
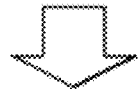
(c)
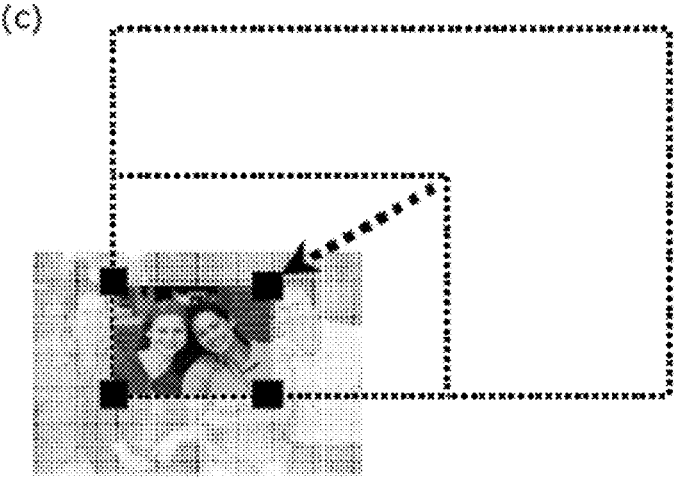

DATA PROCESSING DEVICE AND DATA PROCESSING METHOD WHICH COMPRESSES IMAGE DATA

CROSS REFERENCE TO RELATED APPLICATIONS

The present application is the National Stage of International Application No. PCT/JP2011/001406, filed Mar. 10, 2011, which is based on and claims priority of Japanese Patent Application No. 2010-062954, filed Mar. 18, 2010.

TECHNICAL FIELD

The present invention relates to a data processing device and the like which compresses image data such as still or moving pictures.

BACKGROUND ART

Imaging devices, such as consumer digital still cameras, video cameras, and built-in cameras of mobile phones, provide increasingly high functionality nowadays. These high-functionality imaging devices have functions of taking high-quality pictures or videos, as well as sophisticated functions such as rapid continuous shooting, or functions of automatically assigning meta-information, such as location information on the location of shooting or information on the name of a person in a photograph or video, for example. Such imaging devices having diverse functions are now available to users at low costs.

Popularity of these high-functionality imaging devices is a factor to increase private content handled by individuals, for example, photographs of a family trip or an athletic meet, a video of a recital, etc. With improvement in image quality or increase in added value of content, the size of individual content items is exploding in addition to increase in the amount of data handled by individuals.

There are also increasing occasions where albums or business documents for printing are created with such pictures and the like. In general, images embedded in an album or document increase file size. To address this, an approach is proposed that detects features of such an embedded image using color components of the image and the number and size of face regions, and compresses the image by a predetermined factor when the image is determined to be a photograph image from its color components (see PTL 1, for instance).

CITATION LIST

Patent Literature

[PTL 1] Japanese Unexamined Patent Application Publication No. 2009-27385
[PTL 2] Japanese Unexamined Patent Application Publication No. 2004-295723

SUMMARY OF INVENTION

Technical Problem

However, the method described in PTL 1 may result in loss of meaning information present in uncompressed image data, in compressed image data. Here, meaning information refers to features of an object image included in an image represented by image data. A specific example is described using FIG. 1.

FIG. 1 is a diagram showing an example of problems in a typical size reduction process of image data. (a) in FIG. 1 shows an uncompressed image. (b) to (e) in FIG. 1 show images generated by size reduction of the image shown in (a) in FIG. 1. As shown in FIG. 1, a face or character string included in an image generally becomes smaller as the image is reduced in size. Accordingly, the higher the degree of reduction, the more likely it is that a viewer of the image cannot recognize a person because the face is blurry or cannot make out smudged characters (for example, see (d) or (e) in FIG. 1). That is, excessive reduction process is known to cause loss of meaning information that characterizes an image, such as faces or letters.

Since the technique described in PTL 1 compresses an image with a fixed factor that is predefined based on the number of faces detected and the total sum of their areas, however, it has a problem of being unable to avoid loss of meaning information in a compressed image.

The problem of conventional art is specifically described below using FIG. 2 and FIG. 3.

FIG. 2 is a diagram showing an example of loss of meaning information in an image compressed with a conventional compression technique. (a) in FIG. 2 shows an uncompressed image. (b) in FIG. 2 shows meaning information (human faces) included in the uncompressed image. (c) in FIG. 2 shows an image compressed with a conventional compression technique.

The conventional compression technique has the problem of loss of meaning information as a result of excessive reduction process as shown in (c) in FIG. 2.

Furthermore, in terms of data compression, when image data is compressed using a predefined fixed factor, data compression ratio (hereinafter also simply referred to as "compression ratio" as necessary) cannot be flexibly changed to the condition of meaning information indicating features of an image.

FIG. 3 is a diagram showing a problem in a compression process with a conventional compression technique. (a) in FIG. 3 shows an original image before compression. (b) in FIG. 3 shows an image compressed by a conventional compression technique.

In (b) in FIG. 3, meaning information is not lost in the compressed image as a result of data compression. However, meaning information is still not lost when the image is further compressed as shown in (c) in FIG. 3. That is, the conventional compression technique has another problem of being unable to compress image data to the furthest extent at which loss of meaning information does not occur.

The present invention is intended to solve the existing problems, and an object thereof is to provide a data processing device that can increase image data compression efficiency without loss of meaning information which is included in the uncompressed image, in a compressed image.

Solution to Problem

In order to achieve the object, a data processing device according to an aspect of the present invention compresses image data, and includes: an input unit configured to acquire image data; a meaning information extraction unit configured to extract meaning information indicating a feature of an object image included in an image represented by the image data; a compression specifying unit configured to determine an initial value of a compression ratio which indicates a level of compression efficiency; a compression unit configured to compress the image data according to the compression ratio determined by the compression specifying unit to generate compressed image data; and a determination unit configured to determine whether or not the meaning information extracted by the meaning information extraction unit can be extracted from the compressed image data generated by the compression unit, wherein the compression specifying unit is further configured to change the compression ratio from the initial value according to a result of the determination by the determination unit, and when the compression specifying unit changes the compression ratio, the compression unit is further configured to compress the image data according to the changed compression ratio to newly generate compressed image data.

In this configuration, the image data can be compressed again according to a compression ratio changed depending on whether or not the meaning information can be extracted from compressed image data. Thus, the compression efficiency for the image data can be increased without loss of meaning information which is included in the uncompressed image, in the compressed image.

Furthermore, when the determination unit determines that the meaning information cannot be extracted, the compression specifying unit is preferably configured to change the compression ratio so as to reduce the compression efficiency until the determination unit determines that the meaning information can be extracted, and when the determination unit determines that the meaning information can be extracted, the compression specifying unit is preferably configured to output compressed image data which the determination unit determines that the meaning information can be extracted from.

In this configuration, the compression ratio can be changed so as to lower the compression efficiency until the meaning information can be extracted from compressed image data. Thus, the compression efficiency for the image data can be increased without loss of meaning information in compressed image data.

Furthermore, when the determination unit determines that the meaning information can be extracted, the compression specifying unit is preferably configured to change the compression ratio so as to increase the compression efficiency until the determination unit determines that the meaning information cannot be extracted, and when the determination unit determines that the meaning information cannot be extracted, the compression specifying unit is preferably configured to output last compressed image data which the determination unit has determined that the meaning information can be extracted from.

In this configuration, the compression ratio can be changed so as to increase the compression efficiency until the meaning information can no longer be extracted from compressed image data. Thus, the compression efficiency for image data can be increased without loss of meaning information in compressed image data.

Furthermore, the compression specifying unit is preferably configured to determine the initial value of the compression ratio based on the meaning information extracted by the meaning information extraction unit.

In this configuration, since the initial value of the compression ratio is determined based on the meaning information, compressed image data can be efficiently generated.

Furthermore, the data processing device preferably further includes a data storage unit storing image data, wherein the input unit is configured to acquire the image data by reading the image data from the data storage unit.

In this configuration, the image data stored in the data storage unit can be compressed.

Furthermore, the meaning information extraction unit is preferably configured to extract, as the meaning information, person information indicating a face position, a face area, a facial expression, a posture, or a gesture of a person image included in the image, character information indicating content of a character image included in the image, or object information indicating a type of an object image included in the image.

In this configuration, loss of person information, character information, or object information in compressed image data can be prevented.

Furthermore, when the meaning information extraction unit extracts plural items of the meaning information, the compression specifying unit is preferably configured to select focus meaning information from the items of the meaning information based on an area of an object image corresponding to each of the items of meaning information, and the determination unit is preferably configured to determine whether or not the focus meaning information can be extracted from the compressed image data generated by the compression unit.

In this configuration, focus meaning information can be selected based on the area of the object image corresponding to the meaning information, so meaning information which should be prevented from being lost can be selected according to the area.

Furthermore, when the meaning information extraction unit extracts the plural items of the meaning information, the compression specifying unit is preferably configured to select, as the focus meaning information, one of the items of meaning information for which a proportion of the area of the corresponding object image to an area of the image represented by the image data is largest.

In this configuration, the meaning information corresponding to an object image having an area proportion equal to or larger than a threshold can be selected as focus meaning information. It is thus possible to prevent loss of meaning information in an object image representing the subject of the image and having a large area.

Furthermore, when the meaning information extraction unit extracts the plural items of the meaning information, the compression specifying unit is preferably configured to select, as the focus meaning information, an item of the meaning information for which a proportion of the area is smallest, from among the plural items of the meaning information for each of which a proportion of the area of the corresponding object to an area of the image represented by the image data is equal to or larger than a threshold.

In this configuration, the meaning information corresponding to an object image having an area proportion equal to or larger than a first threshold and smaller than a second threshold can be selected as focus meaning information. Therefore, loss of meaning information can be prevented also for an object image representing a secondary subject and having a relatively small area.

Furthermore, the data processing device preferably further includes: a meaning information storage unit storing meaning information; and a similarity determination unit configured to calculate a similarity that indicates similarity between the meaning information extracted by the meaning information extraction unit and the meaning information stored in the meaning information storage unit, wherein when the meaning information extraction unit extracts plural items of the meaning information, the compression specifying unit is configured to select focus meaning information from the items of meaning information based on the similarity calculated by the similarity determination unit, and the determination unit is configured to determine whether or not the focus meaning information can be extracted from the compressed image data generated by the compression unit.

In this configuration, selection of an object image for which loss of meaning information should be prevented can be controlled by appropriately storing meaning information in the meaning information storage unit.

Furthermore, the compression specifying unit is preferably configured to select, as the focus meaning information, an item of the meaning information for which the similarity calculated by the similarity determination unit is largest, from among the items of the meaning information.

In this configuration, loss of meaning information similar to an item of the meaning information stored in the meaning information storage unit can be prevented.

Furthermore, the compression specifying unit is preferably configured to select, as the focus meaning information, an item of the meaning information for which a proportion of an area of an object image corresponding to the item to an area of the image represented by the image data is smallest, from among the items of the meaning information for each of which the similarity calculated by the similarity determination unit is equal to or larger than a threshold.

In this configuration, loss of meaning information similar to an item of the stored meaning information can be prevented even for an object image having a small area.

Furthermore, the meaning information storage unit is preferably further configured to store frequencies of extraction in association with the respective items of meaning information, the frequencies of extraction each indicating the number of times of extraction performed by the meaning information extraction unit, the data processing device preferably further comprises a ranking management unit configured to calculate ranks which indicate significance of the respective items of meaning information based on the frequencies of extraction stored in the meaning information storage unit, and the compression specifying unit is preferably configured to acquire the ranks calculated by the ranking management unit and associated with the respective items of meaning information extracted by the meaning information extraction unit, and determine the initial value of the compression ratio based on the acquired ranks.

In this configuration, the initial value of compression ratio can be controlled based on ranks that are based on frequencies of extraction of items of the meaning information.

Furthermore, when the meaning information extraction unit extracts plural items of the meaning information, the compression specifying unit is preferably configured to acquire closeness between each of users corresponding to the items of the meaning information and a user corresponding to the data processing device with reference to social information including closeness indicating a degree of the closeness between the users, and select focus meaning information from the items of meaning information based on the acquired closeness, and the determination unit is preferably configured to determine whether or not the focus meaning information can be extracted from the compressed image data generated by the compression unit.

In this configuration, focus meaning information can be selected according to the closeness between users. This can prevent an image of a user who is close to the user operating the data processing device from being lost in compressed image data, for example.

Furthermore, the data processing device preferably further includes a backup management unit configured to manage the compressed image data generated by the compression unit as backup data of the image data stored in the data storage unit.

In this configuration, the backup data of the image data stored in the data storage unit can be managed.

Furthermore, the data processing device preferably further includes a communication unit configured to communicate with at least one external device via a network, wherein the at least one external device includes an auxiliary storage unit in which the backup data is stored, and the backup management unit is configured to save the backup data in the auxiliary storage unit via the communication unit.

In this configuration, the image data can be backed up on an external device which is connected via a network.

Furthermore, the data processing device preferably further includes a device profile acquisition unit configured to acquire a device profile indicating a capability of the external device via the communication unit, wherein the compression specifying unit is configured to determine the initial value of the compression ratio based on the meaning information extracted by the meaning information extraction unit and the device profile acquired by the device profile acquisition unit.

In this configuration, since the initial value of the compression ratio can be determined by utilizing the device profile indicating the capability of the external device, the initial value of compression ratio can be determined according to the capability of the external device.

Furthermore, the device profile preferably includes a storage capacity of the auxiliary storage unit, and the compression specifying unit is preferably configured to determine the initial value of the compression ratio based on the meaning information extracted by the meaning information extraction unit and a capacity ratio between the storage capacity of the auxiliary storage unit included in the device profile and a storage capacity of the data storage unit.

In this configuration, the initial value of the compression ratio can be determined based on the ratio between the storage capacity of a backup source and the storage capacity of a backup destination. It is therefore possible to avoid shortage of storage capacity of the backup destination as well as excessive compression of image data.

Furthermore, the data processing device preferably further includes a user interface unit configured to receive an input of a specified value for the compression ratio from a user, wherein the compression specifying unit is preferably configured to: change the compression ratio to the specified value received by the user interface unit; output the compressed image data when the determination unit determines that the meaning information can be extracted from the compressed image data compressed with the changed compression ratio; and output last compressed image data which the determination unit has determined that the meaning information can be extracted from, when the determination unit determines that the meaning information cannot be extracted from the compressed image data compressed with the changed compression ratio.

In this configuration, when an input of a specified value for the compression ratio is received from the user, compressed image data can be output depending on the result of determination as to whether or not the meaning information can be extracted. This can prevent loss of meaning information which is included in the uncompressed image, in the compressed image within the output compressed image data Furthermore, when the determination unit determines that the meaning information cannot be extracted, the user interface unit is preferably configured to receive, from the user, an input of clipping information for clipping part of an image region of the output compressed image data from the user, the compression unit is preferably configured to clip the part of the image region of the compressed image data according to the clipping information, and the compression specifying unit is preferably configured to output the part of the image region of the compressed image data clipped by the compression unit.

In this configuration, an input of clipping information can be received from the user when it is determined that the meaning information cannot be extracted. It is therefore possible to reduce image size so that meaning information is not lost in the output compressed image data and limit the amount of data.

Furthermore, an integrated circuit according to an aspect of the present invention compresses image data, and includes: an input unit configured to acquire image data; a meaning information extraction unit configured to extract meaning information indicating a feature of an object image included in an image represented by the image data; a compression specifying unit configured to determine an initial value of a compression ratio which indicates a level of compression efficiency; a compression unit configured to compress the image data according to the compression ratio determined by the compression specifying unit to generate compressed image data; and a determination unit configured to determine whether or not the meaning information extracted by the meaning information extraction unit can be extracted from the compressed image data generated by the compression unit, wherein the compression specifying unit is further configured to change the compression ratio from the initial value according to a result of the determination by the determination unit, and when the compression specifying unit changes the compression ratio, the compression unit is further configured to compress the image data according to the changed compression ratio to newly generate compressed image data.

In this configuration, the same effects to those of the data processing device can be attained.

Furthermore, a data processing method of compressing image data includes: acquiring image data; extracting meaning information indicating a feature of an object image included in an image represented by the image data; determining an initial value of a compression ratio which indicates a level of compression efficiency; compressing the image data according to the initial value of the compression ratio determined in the determining to generate compressed image data; and determining whether or not the meaning information extracted in the extracting can be extracted from the compressed image data generated in the compressing, wherein, in the determining of an initial value of a compression ratio, the compression ratio is further changed from the initial value according to a result of determination in the determining whether or not the meaning information can be extracted, and when the compression ratio is changed in the determining an initial value of a compression ratio, the image data is further compressed in the compressing according to the changed compression ratio to newly generate compressed image data.

In this configuration, the same effects to those of the data processing device can be attained.

The present invention can also be embodied as a program which causes a computer to execute the steps included in the data processing method. It goes without saying that such a program can be distributed via a recording medium such as a CD-ROM, or a transmission medium such as the Internet.

Advantageous Effects of Invention

As is apparent from the above description, according to the data processing device and the like according to an aspect of the present invention, image data can be compressed with a compression ratio that is determined depending on whether or not the meaning information can be extracted from compressed image data. It is therefore possible to increase compression efficiency for image data without loss of meaning information which is included in the uncompressed image, in the compressed image.

BRIEF DESCRIPTION OF DRAWINGS

FIG. 7 is a diagram showing an exemplary result of reducing image size of image data received by an input unit in Embodiment 1 of the present invention.

FIG. 9 is a diagram showing an exemplary output of a processing recording table held in the compression specifying unit in Embodiment 1 of the present invention.

FIG. 12 is a diagram showing an example of image data compressed by the data processing device in Embodiment 1 of the present invention.

FIG. 17 is a diagram showing an example of a meaning information storage table stored in a meaning information storage unit in Embodiment 3 of the present invention.

FIG. 18 is a diagram showing an exemplary output of a processing recording table held in the compression specifying unit in Embodiment 3 of the present invention.

FIG. 21 is a diagram showing an example of a meaning information storage table stored in the meaning information storage unit in Embodiment 4 of the present invention.

FIG. 24 is a diagram showing an example of image data compressed by the data processing device of Embodiment 4 of the present invention.

FIG. 26 is a diagram showing an example of capability information acquired by the compression specifying unit in Embodiment 5 of the present invention.

FIG. 27 is a flowchart showing a flow of a backup process in Embodiment 5 of the present invention.

FIG. 30 is a diagram showing an example of capability information acquired by the compression specifying unit in Embodiment 7 of the present invention.

FIG. 32 is a diagram for illustrating the operation of the data processing device in Embodiment 8 of the present invention.

DESCRIPTION OF EMBODIMENTS

Figure 1:
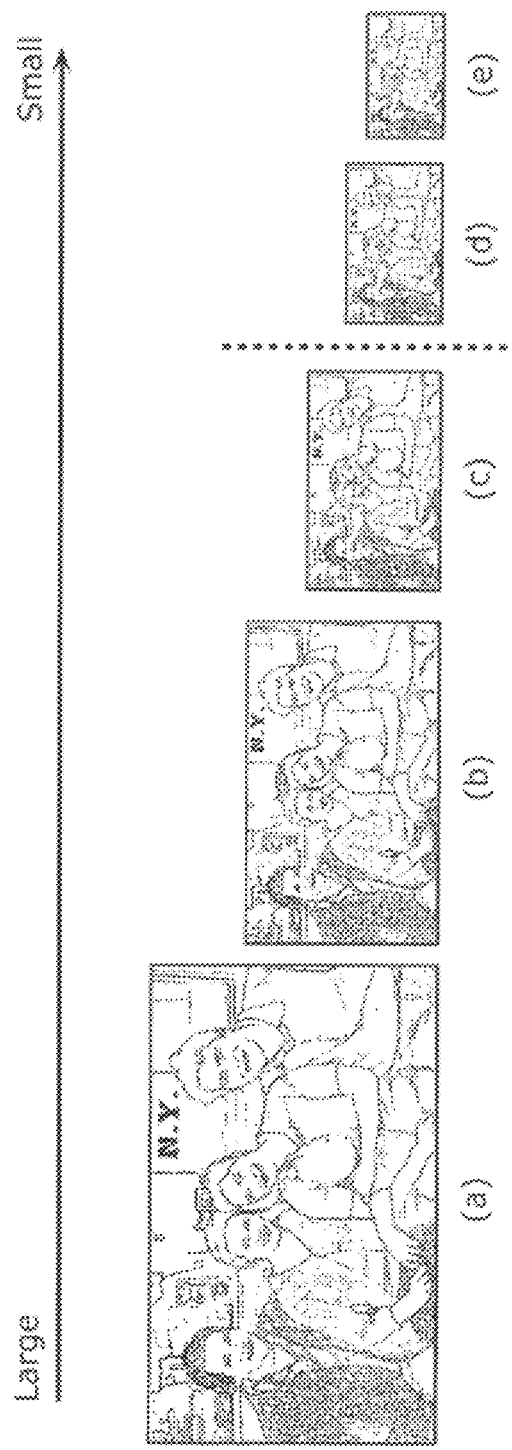
FIG. 1 is a diagram showing an example of problems in a typical size reduction process of image data.
Figure 2:
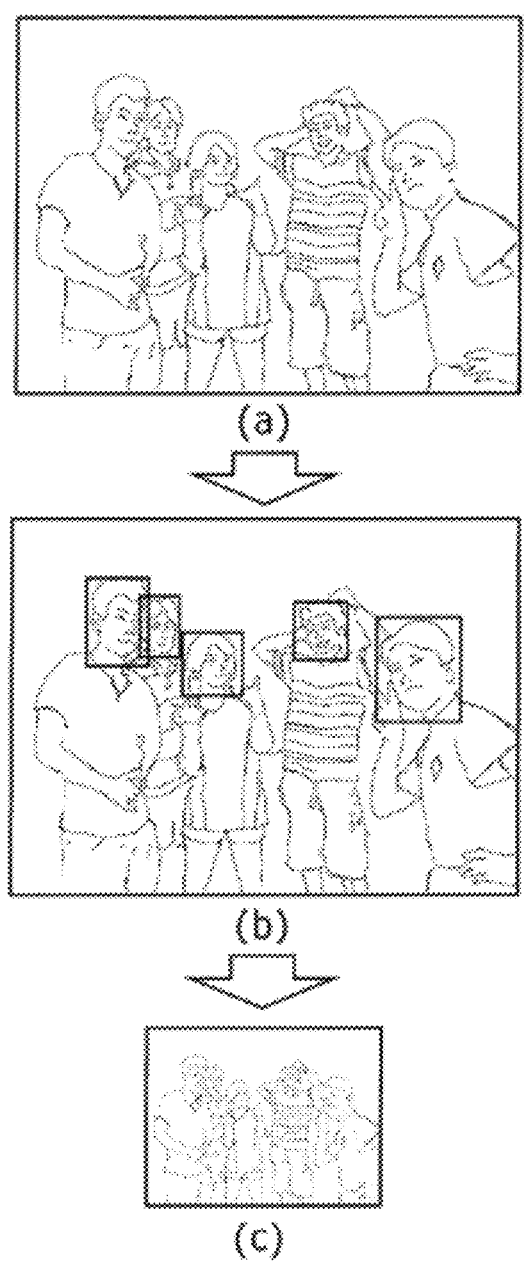
FIG. 2 is a diagram showing an example of loss of meaning information in an image compressed with a conventional compression technique.
Figure 3:
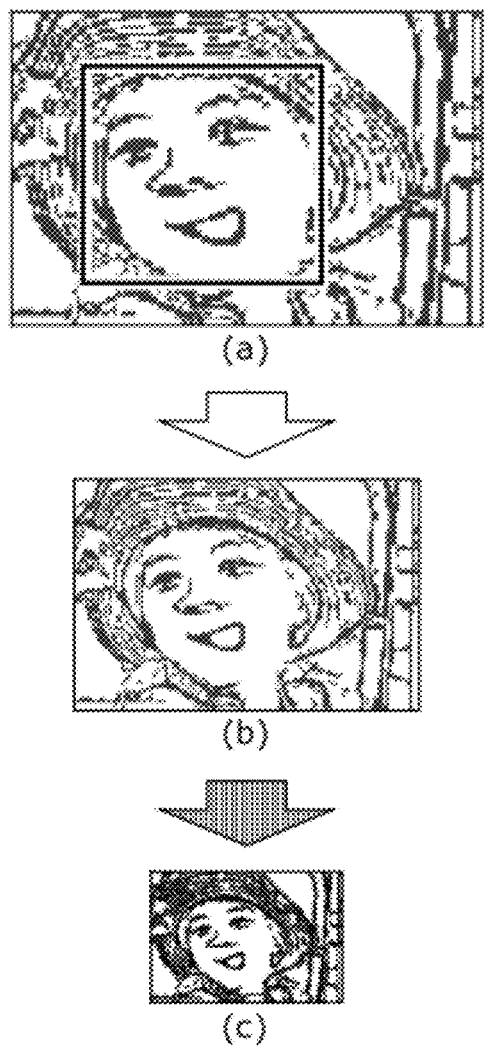
FIG. 3 is a diagram showing a problem in a compression process with a conventional compression technique.

Embodiments of the present invention are described below with reference to drawings. In the embodiments, the same components are denoted with the same reference numerals and therefore the descriptions thereof are omitted as they would be repetition.

Figures 4, 5, 6:
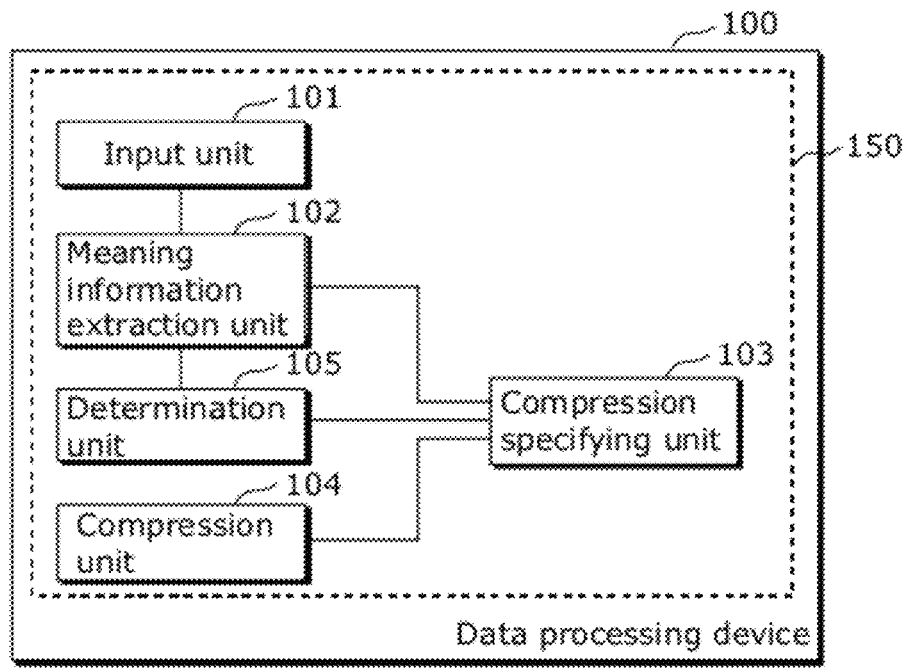
FIG. 4 is a block diagram showing a configuration of a data processing device according to Embodiment 1 of the present invention.
FIG. 5 is a diagram showing an example of a compression policy table held in a compression specifying unit in Embodiment 1 of the present invention.
FIG. 6 is a diagram showing an example of a threshold table held in the compression specifying unit in Embodiment 1 of the present invention.

FIG. 4 is a block diagram showing a configuration of a data processing device 100 according to Embodiment 1 of the present invention. As shown in FIG. 4, the data processing device 100 includes an input unit 101, a meaning information extraction unit 102, a compression specifying unit 103, a compression unit 104, and a determination unit 105.

The data processing device 100 is a device that performs data compression on image data. The data processing device 100 is, for example, a video recorder or a home server on which an external storage medium with image data stored therein can be loaded, or a digital still camera or a digital video camera that can take still or moving pictures.

The input unit 101 receives image data to be processed via an input unit implemented in the data processing device 100 (for example, an interface with an external storage medium or a built-in camera module). Furthermore, the input unit 101 transfers the received image data to the meaning information extraction unit 102.

The meaning information extraction unit 102 analyzes image data transferred from the input unit 101. Specifically, the meaning information extraction unit 102 extracts meaning information indicating a feature of an object image (for example, a face position in a human image) included in an image represented by the image data. Furthermore, the meaning information extraction unit 102 transfers the image data to the compression specifying unit 103 with the extracted meaning information.

More specifically, the meaning information extraction unit 102 detects an object image (for example, an image of a person's face) included in an image by matching an image represented by image data with a template image prepared in advance, for example. The meaning information extraction unit 102 then extracts, for example, the position of the detected object image in the image as meaning information.

The compression specifying unit 103 evaluates the image data and meaning information transferred from the meaning information extraction unit 102. The compression specifying unit 103 then determines an initial value of compression ratio for the image data, based on the meaning information extracted by the meaning information extraction unit 102. Furthermore, the compression specifying unit 103 outputs an instruction for executing a compression process on the image data according to the determined initial value of the compression ratio to the compression unit 104.

The compression unit 104 compresses the image data in response to the instruction received from the compression specifying unit 103 and returns a result of the compression process to the compression specifying unit 103. That is, the compression unit 104 generates compressed image data by compressing image data according to the compression ratio determined by the compression specifying unit 103. That is, the compression unit 104 compresses image data such that a compression ratio represented by the data amount of the uncompressed image data and the data amount of compressed image data agrees with the compression ratio determined by the compression specifying unit 103. More specifically, the compression unit 104 selects, for example, an image size, compression parameters, or a compression algorithm according to the compression ratio to perform lossy compression on image data such that the compression ratio identified from the result of compression agrees with the determined compression ratio.

Here, a compression ratio refers to a value that indicates compression efficiency for image data, and the compression efficiency indicates the degree of reduction in the amount of image data due to compression. For example, high compression efficiency indicates that data is reduced by a large amount due to compression.

More specifically, a compression ratio represents a ratio of the amount of compressed image data to the amount of uncompressed image data, for example. In this case, a larger value of compression ratio indicates lower compression efficiency.

The compression specifying unit 103 then transfers the result of compression process returned from the compression unit 104 to the determination unit 105 and instructs the determination unit 105 to determine whether or not loss of the meaning information has occurred.

In accordance with the instruction from the compression specifying unit 103, the determination unit 105 makes an inquiry to the meaning information extraction unit 102 as to whether or not the meaning information can be extracted. The determination unit 105 returns the result of the determination as to whether the meaning information can be extracted to the compression specifying unit 103 in response to the inquiry.

That is, the determination unit 105 determines whether or not the meaning information extracted by the meaning information extraction unit 102 can be extracted from the compressed image data generated by the compression unit 104. Here, that meaning information extracted by the meaning information extraction unit 102 can be extracted means not only that it is possible to extract meaning information that is exactly the same as the meaning information extracted by the meaning information extraction unit 102 but also that it is possible to extract meaning information similar to the meaning information extracted by the meaning information extraction unit 102. That is, the determination unit 105 determines whether meaning information the same as or similar to the meaning information extracted by the meaning information extraction unit 102 can be extracted from the compressed image data generated by the compression unit 104.

More specifically, when meaning information represents, for example, the position of an object image, the determination unit 105 determines whether or not meaning information indicating a position within a predetermined range from the position extracted from uncompressed image data can be extracted from compressed image data. The predetermined range may be determined experimentally or empirically.

Note that when uncompressed image data is different from compressed image data in size, the determination unit 105 preferably converts at least one of meaning information extracted from the uncompressed image data and meaning information extracted from the compressed image data as necessary so that the two items of the meaning information can be compared to each other. For example, when meaning information indicates the area or position of an object image, the determination unit 105 preferably converts the area or position indicated by meaning information extracted from compressed image data into the area or position corresponding to the image size of uncompressed image data.

The compression specifying unit 103 changes the compression ratio for image data according to the result of determination as to whether or not the meaning information can be extracted returned from the determination unit 105. That is, the compression specifying unit 103 changes the compression ratio from its initial value according to the result of determination made by the determination unit 105. Specifically, the compression specifying unit 103 changes the compression ratio for image data when it is determined that the meaning information cannot be extracted. More specifically, when compression ratio is 40% and an increment value is set to, for example, 1%, the compression specifying unit 103 changes the compression ratio to 41%.

Furthermore, the compression specifying unit 103 outputs an instruction to the compression unit 104 again for executing a compression process on the image data with the changed data compression ratio. That is, when the compression specifying unit 103 changes compression ratio, the compression unit 104 compresses the image data with the changed compression ratio to newly generate compressed image data.

The compression specifying unit 103 then iteratively changes the data compression ratio until the result of determination as to whether or not the meaning information can be extracted returned from the determination unit 105 indicates that the meaning information can be extracted, and repeats the process until an optimal data compression ratio with which meaning information is not lost is obtained. That is, when the determination unit 105 determines that the meaning information cannot be extracted, the compression specifying unit 103 iteratively changes the compression ratio so as to reduce the compression efficiency until the determination unit 105 determines that the meaning information can be extracted.

When the determination unit 105 determines that the meaning information can be extracted, the compression specifying unit 103 outputs compressed image data from which the meaning information is extracted.

Next, a compression policy table which is referenced when the compression specifying unit 103 determines the initial value of compression ratio is described.

FIG. 5 is a diagram showing an example of a compression policy table held in the compression specifying unit 103 in Embodiment 1 of the present invention. FIG. 6 is a diagram showing an example of a threshold table held in the compression specifying unit 103 in Embodiment 1 of the present invention.

In the compression policy table, compression policy levels are stored in association with presence/absence of meaning information, area proportion, and the number of meaning information items as shown in FIG. 5.

A compression policy level indicates the level of compression efficiency and has a one-to-one correspondence with a compression ratio. Note that five compression policy levels are assumed herein for simplifying description.

Presence/absence of meaning information indicates whether or not meaning information can be extracted from uncompressed image data. Here, "True" means that meaning information can be extracted and "False" means that meaning information cannot be extracted.

Area proportion indicates whether the ratio of area of an object image corresponding to extracted meaning information to the total area of the image (hereinafter simply referred to as "area proportion for meaning information") is large or small. Herein, "Large" means that area proportion for meaning information is large and "Small" means that area proportion for meaning information is small.

The number of meaning information items indicates whether the number of items of meaning information extracted from uncompressed image data is large or small. Herein, "Many" means the number of meaning information items extracted is small and "few" means the number of meaning information items extracted is small.

The compression specifying unit 103 determines a compression policy level according to parameters relating to meaning information with reference to the compression policy table. That is, the compression specifying unit 103 determines the initial value of compression ratio based on meaning information extracted by the meaning information extraction unit 102, with reference to the compression policy table.

Here, ratings in the compression policy table ("Large", "Small", "Many", and "Few") are set such that reference is made to the threshold table shown in FIG. 6 as appropriate. Consequently, the data processing device 100 can easily adjust a reference value (threshold) that is required for determining the compression ratio for image data to meet needs by varying values stored in the threshold table.

Herein, "Large" is set so as to indicate that the area proportion for meaning information exceeds 20%. "Small" is set so as to indicate that the area proportion for meaning information is equal to or less than 20%.

Likewise, "Many" is set so as to indicate that the number of items of meaning information extracted is two or larger. "Few" is set so as to indicate that the number of items of meaning information extracted is smaller than two.

Note that these reference values (thresholds) may be predetermined experimentally or empirically.

FIG. 7 is a diagram showing an exemplary result of reducing image size of image data acquired by the input unit 101 in Embodiment 1 of the present invention. "A-1" to "A-5" in FIG. 7 are names of original image data acquired by the input unit 101. The image data "A-1" to "A-5" each has an image size of 4,000 pixels wide and 3,000 pixels high. Hereinafter, the image data with names "A-1" to "A-5" are referred to as input images A-1 to A-5, respectively.

The input image A-1 is a scenic picture including no people. The input image A-2 is a portrait picture showing a closeup of a person. The input image A-3 is a group picture showing several people in a relatively large size. The input image A-4 is a picture showing a person positioned at a distance in a small size. The input image A-5 is a group picture showing plural people in a very small size.

Output images "B-1" to "B-5" represent examples of a simple compression process performed on the input images A-1 to A-5, respectively, with a compression ratio that depends on the compression policy levels. From each of the sizes after compression, it can be seen that the image data is compressed with a fixed data compression ratio. At the same time, it is also seen that part of information on the peoples' faces, which are the subject of the pictures, is lost due to uniform conversion.

Operations of the data processing device 100 thus configured are discussed next. Specifically, the flow of a data compression process performed by the compression specifying unit 103 in Embodiment 1 of the present invention is described using FIG. 8 to FIG. 11 in which the compression specifying unit 103 performs data compression according to the compression policy levels so as to avoid loss of meaning information in conjunction with the determination unit 105.

Figure 8:
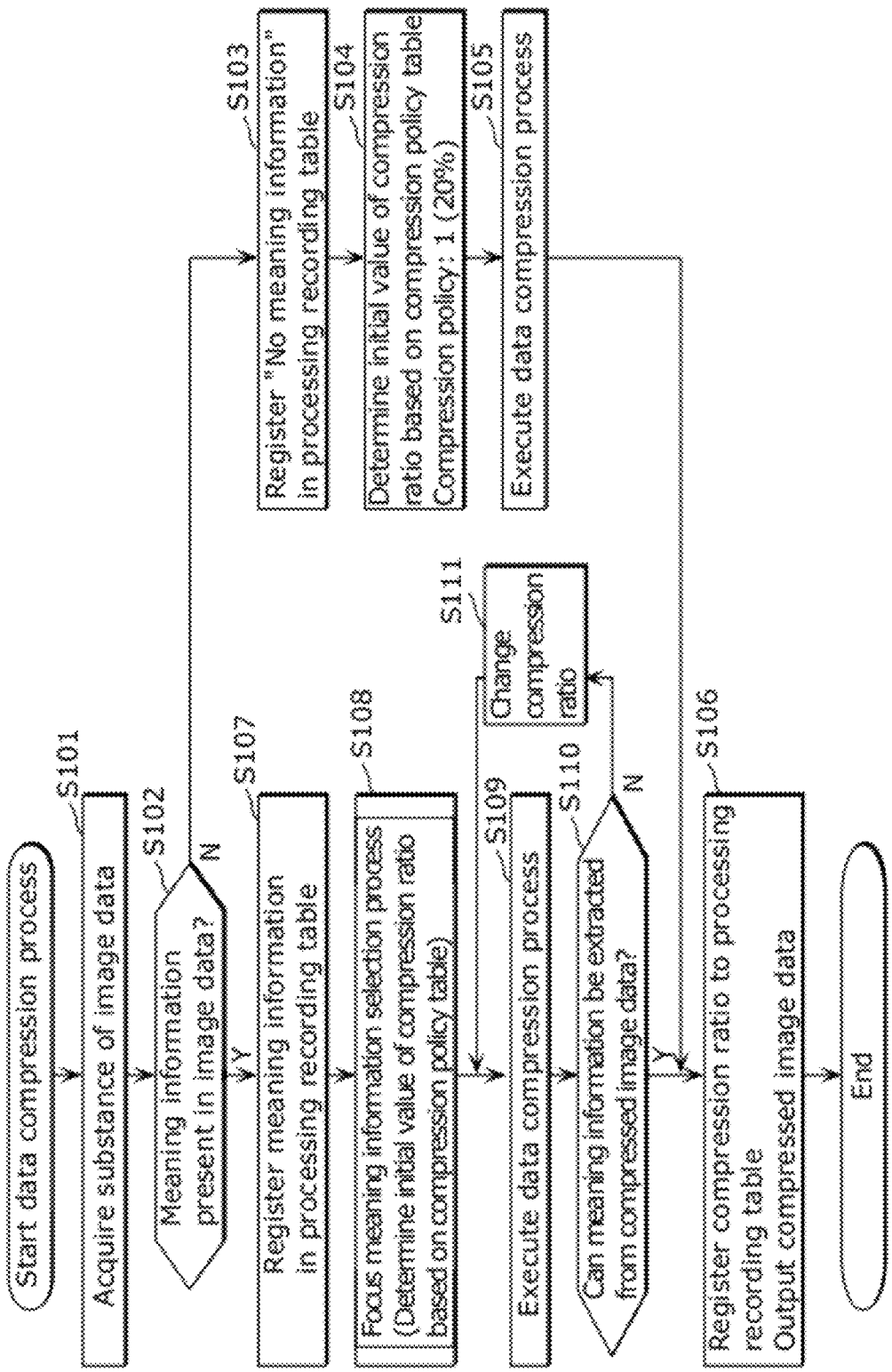
FIG. 8 is a flowchart showing a flow of a data compression process in Embodiment 1 of the present invention.

FIG. 8 is a flowchart showing a flow of a data compression process in Embodiment 1 of the present invention. FIG. 9 is a diagram showing an exemplary output of a processing recording table held in the compression specifying unit 103 in Embodiment 1 of the present invention.

First, the input unit 101 acquires the substance of image data (step S101). Subsequently, the meaning information extraction unit 102 checks whether meaning information is present or not in the image data transferred from the input unit 101 (step S102). That is, the meaning information extraction unit 102 extracts meaning information from the image data.

If no meaning information is present in the image data at step S102 (N at step S102), the compression specifying unit 103 registers information indicating "No meaning information" in the processing recording table (step S103). Specifically, the compression specifying unit 103 registers "false" in presence/absence of meaning information as information indicating "no meaning information" for data name A-1 as shown in FIG. 9, for example.

The compression specifying unit 103 then determines the initial value of compression ratio for the image data with reference to the compression policy table held in the compression specifying unit 103 (step S104). Specifically, the compression specifying unit 103 determines that the compression policy is "1" and sets the initial value of compression ratio to "20%" with reference to the compression policy table shown in FIG. 5, for example. The compression specifying unit 103 then instructs the compression unit 104 to execute a data compression process.

The compression unit 104 subsequently compresses the image data according to the determined compression ratio to generate compressed image data (step S105). Upon obtaining a result that processing by the compression unit 104 has been correctly done, the compression specifying unit 103 registers the data compression ratio used for actual processing in the processing recording table (step S106), and ends the process. That is, the compression specifying unit 103 outputs compressed image data and ends the process.

On the other hand, if meaning information is present in the image data at step S102 (Y at step S102), the compression specifying unit 103 registers extracted meaning information in the processing recording table (step S107). Specifically, the compression specifying unit 103 registers a coordinate X "1254" and a coordinate Y "453" that indicate the face position, and a width W "334" and a height H "365" indicating the face size as meaning information for input image A-2 as shown in FIG. 9, for example.

The compression specifying unit 103 then determines the initial value of compression ratio for focus meaning information, which is selected through a "focus meaning information selection process" described later (step S108).

The compression specifying unit 103 then instructs the compression unit 104 to execute a data compression process using the initial value of the compression ratio determined at step S108 (for example, "40%" for the input image A-2) (step S109). That is, the compression unit 104 generates compressed image data by compressing image data according to the determined initial value of the compression ratio.

The compression specifying unit 103 subsequently makes an inquiry to the determination unit 105 as to whether or not the meaning information can be extracted in the compressed data in regard to the result of compression process returned from the compression unit 104 (step S110). That is, the determination unit 105 determines whether or not the meaning information extracted at step S102 can be extracted from the compressed image data.

Specifically, the determination unit 105 determines that the meaning information can be extracted from compressed image data which is generated by compressing image data for input image A-2 with the initial value of compression ratio "40%", for example.

If the determination unit 105 returns a response indicating that extraction is not possible (N at step S110), the compression specifying unit 103 changes the compression ratio by adding a predetermined increment value ("1%" in this example) to the current compression ratio value (step S111). That is, when the determination unit 105 determines that the meaning information cannot be extracted, the compression specifying unit 103 changes the compression ratio so that compression efficiency decreases.

The compression specifying unit 103 then repeats the processing at steps S109 and S110 until a response indicating that extraction is possible is returned from the determination unit 105. That is, when the determination unit 105 determines that the meaning information cannot be extracted, the compression specifying unit 103 changes the compression ratio so as to reduce the compression efficiency until the determination unit 105 determines that the meaning information can be extracted. This operation is described in detail later using the input image A-3 as an example.

On the other hand, if a response indicating that extraction is possible is obtained from the determination unit 105 (Y at step S110), the compression specifying unit 103 registers the current compression ratio in the processing recording table (step S106), and ends the process. That is, when the determination unit 105 determines that the meaning information can be extracted, the compression specifying unit 103 outputs compressed image data from which the meaning information is extracted.

Figure 10:
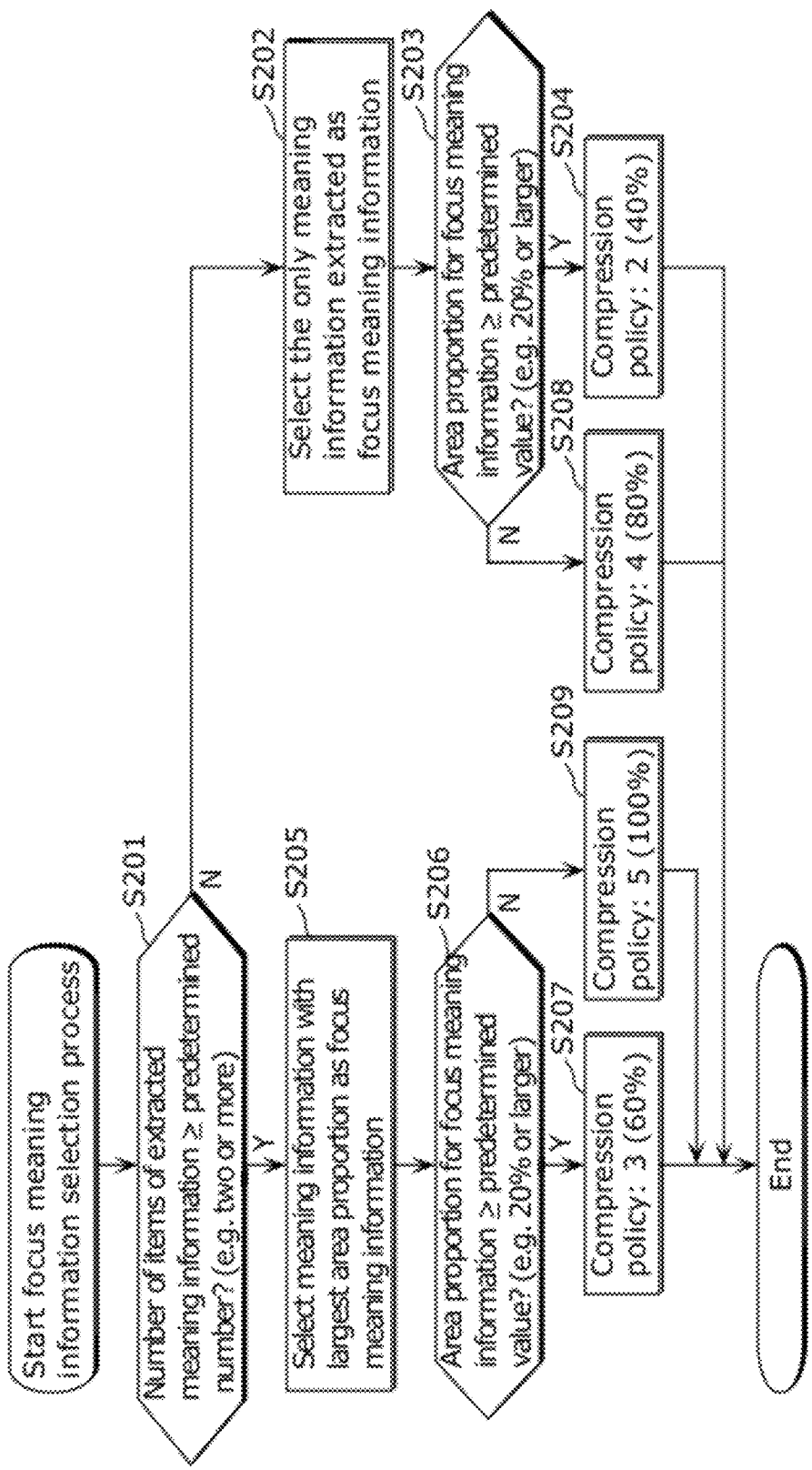
FIG. 10 is a flowchart showing a flow of a focus meaning information selection process in Embodiment 1 of the present invention.

Details of the focus meaning information selection process at step S108 is described now using FIG. 10.

Figure 11:
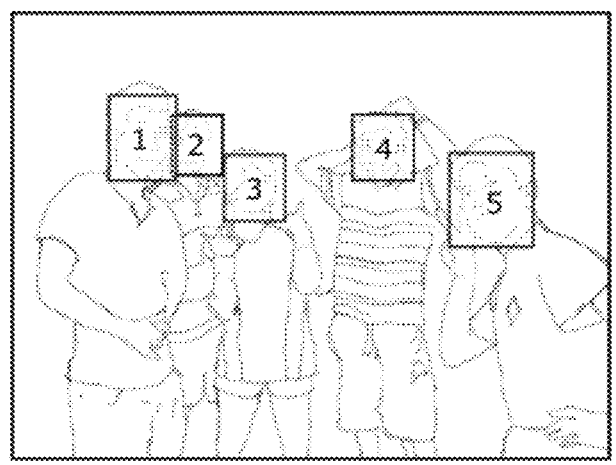
FIG. 11 is an illustration showing an example of positions of object images included in an image.

FIG. 10 is a flowchart diagram showing a flow of focus meaning information selection process in Embodiment 1 of the present invention. FIG. 11 is an illustration showing an example of positions of object images included in an image.

The compression specifying unit 103 determines whether or not the number of items of extracted meaning information is equal to or larger than a predetermined number (step S201). The predetermined number has a value predetermined by experiment or based on experience, for example. In Embodiment 1, the predetermined number is determined according to the threshold table shown in FIG. 6 and is specifically "2".

If it is determined at step S201 that the number of items of meaning information is not equal to or larger than the predetermined number (N at step S201), the only item of meaning information extracted is selected as focus meaning information (step S202).

The compression specifying unit 103 then determines whether or not the area proportion for the selected focus meaning information is equal to or larger than a predetermined value (step S203). The predetermined value is predetermined by experiment or based on experience, for example. In Embodiment 1, the value is determined according to the threshold table shown in FIG. 6 and is specifically "20%".

If the area proportion for the focus meaning information is equal to or larger than the predetermined value (Y at step S203), the compression specifying unit 103 determines that compression policy is "2" and sets the initial value of compression ratio to "40%", according to the compression policy table shown in FIG. 5 (step S204).

On the other hand, if the area proportion for the focus meaning information is smaller than the predetermined value (N at step S203), the compression specifying unit 103 determines that the compression policy is "4" and sets the initial value of compression ratio to "80%", according to the compression policy table shown in FIG. 5 (step S208).

On the other hand, if it is determined at step S201 that the number of items of meaning information is equal to or larger than the predetermined value (Y at step S201), the compression specifying unit 103 selects, as focus meaning information, the item of meaning information for which area proportion is largest (step S205). That is, when plural items of meaning information are extracted, the compression specifying unit 103 selects focus meaning information from the items of the meaning information based on the area of an object image corresponding to each of the items of the meaning information.

Note that the compression specifying unit 103 does not necessarily have to select, as focus meaning information, the item of meaning information for which area proportion is largest. For example, the compression specifying unit 103 may select, as the focus meaning information, meaning information for which area proportion is equal to or larger than a threshold. Even in this case, the compression specifying unit 103 can select focus meaning information as in the case where the item of meaning information for which area proportion is largest is selected, as the focus meaning information, as long as the threshold is appropriately determined.

The compression specifying unit 103 then determines whether or not the area proportion for the selected focus meaning information is equal to or larger than the predetermined value (step S206).

If the area proportion for the focus meaning information is equal to or larger than the predetermined value (Y at step S206), the compression specifying unit 103 determines that the compression policy is "3" and sets the initial value of compression ratio to "60%", according to the compression policy table shown in FIG. 5 (step S207).

On the other hand, if the area proportion for the focus meaning information is smaller than the predetermined value (N at step S206), the compression specifying unit 103 determines that compression policy is "5" and sets the initial value of compression ratio to "100%", according to the compression policy table shown in FIG. 5 (step S209).

As described above, the compression specifying unit 103 selects the focus meaning information from plural items of meaning information based on the area proportion of each of the items of the meaning information when the plural items of the meaning information are extracted. The compression specifying unit 103 then determines the initial value of compression ratio based on the selected focus meaning information.

The flow of the above-described process is described more specifically below using the input images shown in FIG. 7. In the following description, meaning information refers to information that indicates features of a human face image.

The flowchart shown in FIG. 10 is described first using the input image A-2 mentioned above (a portrait picture showing a closeup of a person). Because one item of meaning information is extracted from the input image A-2, the compression specifying unit 103 determines that the number of items of meaning information extracted is not equal to or larger than the predetermined value of "2" (N at step S201). The compression specifying unit 103 then selects the only meaning information extracted as focus meaning information (step S202). Here, since the area proportion for the focus meaning information to the input image A-2 is larger than the predetermined value of "20%" (Y at step S203), the compression specifying unit 103 determines that compression policy is "2" and sets the initial value of compression ratio to "40%" (step S204).

Next, the flowchart shown in FIG. 10 is described using the input image A-3 mentioned above (a group picture showing several people in a relatively large size). Because five items of meaning information are extracted from input image A-3, the compression specifying unit 103 determines that the number of items of meaning information extracted is larger than the predetermined number of "2" (Y at step S201). The compression specifying unit 103 then selects, as the focus meaning information, the item of meaning information for which the area proportion is largest among the items of the meaning information (step S205). That is, for the input image A-3, as is apparent from FIG. 11 generally illustrating the positions of face images, the item of the meaning information that corresponds to a face region 5 having the largest area is selected as focus meaning information from among the face regions 1 to 5 corresponding to the respective items of meaning information. Here, since the area proportion for the selected focus meaning information is larger than the predetermined value of "20%" (Y at step S206), the compression specifying unit 103 determines that compression policy is "3" and sets the initial value of compression ratio to "60%" (step S207).

The flowchart shown in FIG. 10 is further described using the input image A-4 (a picture showing a person positioned at a distance in a small size). Because one item of meaning information is extracted from input image A-4, the compression specifying unit 103 determines that the number of items of meaning information extracted is not equal to or larger than the predetermined number of "2" (N at step S201). The compression specifying unit 103 then selects the only meaning information extracted as the focus meaning information (step S202). Here, since the area proportion for the selected focus meaning information is smaller than the predetermined value of "20%" (N at step S203), the compression specifying unit 103 determines that compression policy is "4" and sets the initial value of compression ratio to "80%" (step S208).

The flowchart shown in FIG. 10 is further described using the input image A-5 (a group picture showing plural people in a very small size). Because five items of meaning information are extracted from input image A-5, the compression specifying unit 103 determines that the number of items of extracted meaning information is larger than the predetermined number of "2" (Y at step S201). The compression specifying unit 103 then selects, as focus meaning information, the item of meaning information for which the area proportion is largest among the items of the meaning information (step S205). Here, since the area proportion for the selected focus meaning information is smaller than the predetermined value of "20%" (N at step S206), the compression specifying unit 103 determines that compression policy is "5" and sets the initial value of compression ratio to "100%" (step S209).

As described above, the compression specifying unit 103 selects the focus meaning information according to the condition of meaning information extracted from image data. The compression specifying unit 103 then determines the initial value of compression ratio for the image data based on the meaning information, with reference to the compression policy table.

Processing at S109 and subsequent steps of FIG. 8 is now described in detail using the input image A-3.

The compression specifying unit 103 sets the initial value of compression ratio to "60%" for image data at step S108. At step S109, the compression specifying unit 103 then instructs the compression unit 104 to execute a compression process with the specified compression ratio of "60%". When the image data is compressed with the compression ratio of "60%", however, the compression specifying unit 103 may receive, from the determination unit 105, a response indicating that the focus meaning information cannot be extracted. This is because even when the compression ratio satisfies the conditions for determining the focus meaning information, the focus meaning information could be lost when specified compression is actually applied with the compression ratio. Thus, in the case where meaning information is lost when a compression process is executed with the compression ratio having the initial value according to the compression policy (N at step S110), the compression specifying unit 103 iteratively changes the value of the compression ratio by a predetermined increment value until the compression ratio reaches a level at which loss of meaning information does not occur as discussed above (step S111). Because the compression ratio at which the focus meaning information in the input image A-3 (the face region 5 in FIG. 11) can be extracted as meaning information is "63%", the compression specifying unit 103 registers the compression ratio of "63%" of the processing result in the processing recording table shown in FIG. 9.

Also for the input image A-4, the compression specifying unit 103 sets the initial value of compression ratio for the image data to "80%" at step S108. At step S109, the compression specifying unit 103 instructs the compression unit 104 to execute a compression process with the specified compression ratio of "80%". However, because the focus meaning information cannot be extracted from image data compressed with the compression ratio of "80%", the compression specifying unit 103 changes the compression ratio value to "91%" by repeating the processing at steps S110 and S111.

FIG. 12 is a diagram showing an example of image data compressed by the data processing device 100 in Embodiment 1 of the present invention. Specifically, FIG. 12 is a diagram showing an example of image data and image size resulting from compression process performed on the image size of the image data input from the input unit 101 with a data compression ratio based on the result of meaning information extraction in Embodiment 1 of the present invention.

FIG. 12 shows that data the compression ratio for image data is flexibly varied without loss of meaning information, as compared to the simple compression process shown in FIG. 7 (see images after processing with image names after processing "C-3" and "C-4").

In this configuration, the data processing device 100 determines the initial value of compression ratio for image data according to condition of meaning information included in image data. The data processing device 100 automatically changes the compression ratio until the focus meaning information can be extracted from compressed image data. Thus, when meaning information is the position of a face, for example, the data processing device 100 can control a size reduction process on the image to the minimum size at which the face can be extracted from the position. In other words, the data processing device 100 does not require an operation to order a data compression process on image data from the user and can reduce the storage capacity for saving compressed image data to the minimum necessary. In addition, because the size reduction process is controlled so that the face serving as meaning information included in the image is not blurred due to reduction, the data processing device 100 can prevent loss of meaning information, which is too often lost in a batch data compression process with a predetermined compression ratio.

That is, the data processing device 100 can increase compression efficiency for image data without loss of meaning information which is included in an uncompressed image, in a compressed image.

Note that although meaning information indicating features of an object image included in an image is the position and area of a face in a human image in Embodiment 1, meaning information may also be person information indicating a facial expression, a posture, or a gesture of a person in an image, character information indicating the content of character images included in an image, or object information indicating the type of an object image included in an image (for example, animal, building, vehicle, scene, plant, or artifact (for example, a flag, housewares, clothing)).

Being thus configured, the data processing device 100 can also control a character string on a sign board, or object information such as a landmark in a town, as a subject for monitoring loss status of meaning information in addition to face information among items of meaning information included in image data. It therefore can prevent loss of context information that represents a situation such as a travel and a recital. That is, the data processing device 100 can prevent loss of person information, character information, or object information in compressed image data.

In addition, although the compression policy table in Embodiment 1 has the five compression policy levels defined so as to correspond to compression ratios from 20% to 100%, it is not necessarily required to define five compression policy levels. For example, the compression policy table may have ten compression policy levels defined. Furthermore, although the compression policy levels and the compression ratios are stored in the compression policy table in association with presence/absence of meaning information, the magnitude of area proportion of an object image with respect to the total area, and the number of items of meaning information in relation to image data, compression policy levels and compression ratios do not necessarily have to be stored in this manner For example, compression ratios may be stored in the compression policy table in association with meaning information parameters (for example, preferentially setting a low compression ratio for an image showing a person with a smile to keep it a high-quality image).

In addition, although the proportion of area of an object image with respect to the total area, "20%", and the number of items of meaning information, "2", are stored in the threshold table as thresholds in Embodiment 1, thresholds are not limited to these values. For example, thresholds may be freely configurable by the user along with parameter options.

In addition, Embodiment 1 has shown an example where the compression specifying unit 103 lowers compression efficiency (for example, changing the value of compression ratio from "40%" to "41%" or higher as appropriate) so that loss of meaning information included in image data is prevented, when the meaning information cannot be extracted from compressed image data,. On the other hand, when the meaning information can be extracted with a specified compression ratio, it is also possible to reduce the data amount of image data to the minimum by increasing compression efficiency (for example, changing the compression ratio from "40%" to "39%" or lower as appropriate) without loss of meaning information included in image data.

In other words, when the determination unit 105 determines that the meaning information can be extracted, the compression specifying unit 103 may change the value of compression ratio so as to increase the compression efficiency until the determination unit 105 determines that the meaning information cannot be extracted In this case, when the determination unit 105 determines that the meaning information cannot be extracted, the compression specifying unit 103 outputs the last compressed image data which the determination unit 105 has determined that the meaning information can be extracted from. The data processing device 100 thereby can increase the compression efficiency for image data without loss of meaning information in compressed image data.

In addition, although Embodiment 1 has been described by illustrating the case where the increment value for changing compression ratio is "1%" for simplifying description, the increment value is not limited to "1%". The increment value may be "5%", for example. The increment value may also be established stepwise or variably according to image type or compression ratio.

In addition, although in Embodiment 1 the compression unit 104 changes image size for compressing image data so that the compression ratio determined or changed by the compression specifying unit 103 is achieved, image data may not necessarily be compressed in this manner. For example, the compression unit 104 may change a parameter value that is used with an image compression technique such as JPEG (Joint Photographic Experts Group) technique and compress image data using the changed parameter so that the determined or changed compression ratio is achieved. Furthermore, the compression unit 104 may change both image size and a parameter value for compressing image data so that the determined or changed compression ratio is achieved.

In addition, although in Embodiment 1 the compression specifying unit 103 selects, as focus meaning information, the item of the meaning information for which the area proportion is largest, focus meaning information does not necessarily have to be selected in this manner. For example, the compression specifying unit 103 may select, as the focus meaning information, the item of the meaning information for which the area proportion is smallest, from among items of the meaning information for each of which the area proportion is within a predetermined range (for example, a face image occupying an area of 5% or larger). In other words, the compression specifying unit 103 may select, as focus meaning information, the item of meaning information for which the area proportion is smallest, from among items of meaning information having area proportions equal to or larger than a threshold.

In this configuration, out of items of meaning information extracted, meaning information for which the display area of face information falls within a predetermined range and is smallest is specified as the focus meaning information, for example, and data compression ratio is controlled such that the meaning information of interest is not lost. It is therefore possible to prevent loss of meaning information that has been captured as a secondary subject among plural subjects included in an image.

In addition, although the compression specifying unit 103 determines the initial value of compression ratio based on meaning information with reference to the compression policy table in Embodiment 1, the initial value of compression ratio does not necessarily have to be determined in this manner. For example, the compression specifying unit 103 may determine a given compression ratio as the initial value. Because compression ratio is changed according to the result of determination by the determination unit 105 also in this case, the data processing device 100 can still increase the compression efficiency for image data without loss of meaning information in compressed image data.

[Embodiment 2]

Embodiment 2 of the present invention is described next.

The data processing device 100 in Embodiment 2 is different from the data processing device 100 of Embodiment 1 mainly in that it further includes a data storage unit 106. The data processing device 100 in Embodiment 2 is described below mainly in regard to its differences from Embodiment 1.

Figure 13:
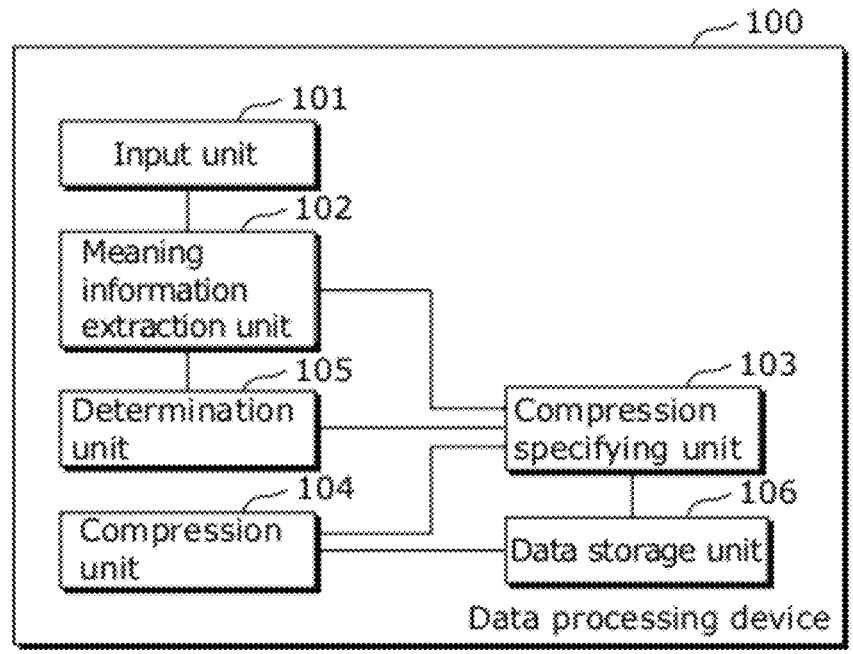
FIG. 13 is a block diagram showing a configuration of the data processing device according to Embodiment 2 of the present invention.

FIG. 13 is a block diagram showing a configuration of the data processing device 100 according to Embodiment 2 of the present invention. In FIG. 13, the same reference numerals are used for the same components as in FIG. 4, and therefore the description thereof is omitted.

As shown in FIG. 13, the data processing device 100 has the data storage unit 106 in addition to the components shown in FIG. 4.

The data processing device 100 in Embodiment 2 is, for example, a video recorder or a home server which can store plural items of image data read from an external storage medium in which the image data is stored, or a digital still camera or a digital video camera that can take and store plural still or moving pictures.

The data storage unit 106 is a storage medium, such as a hard disk, storing at least one item of image data. The data storage unit 106 also stores attribute information for image data stored therein.

Operations of the data processing device 100 thus configured are discussed next.

Figure 14:
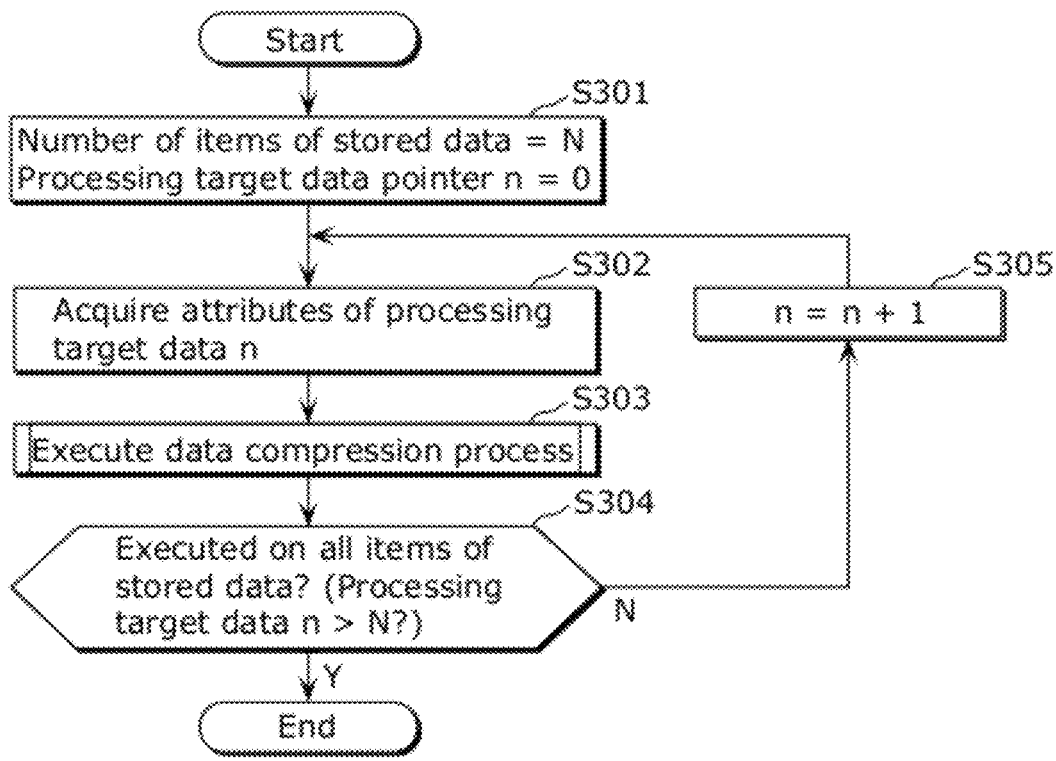
FIG. 14 is a flowchart showing a flow of a data compression process in Embodiment 2 of the present invention.
Figures 15, 16:
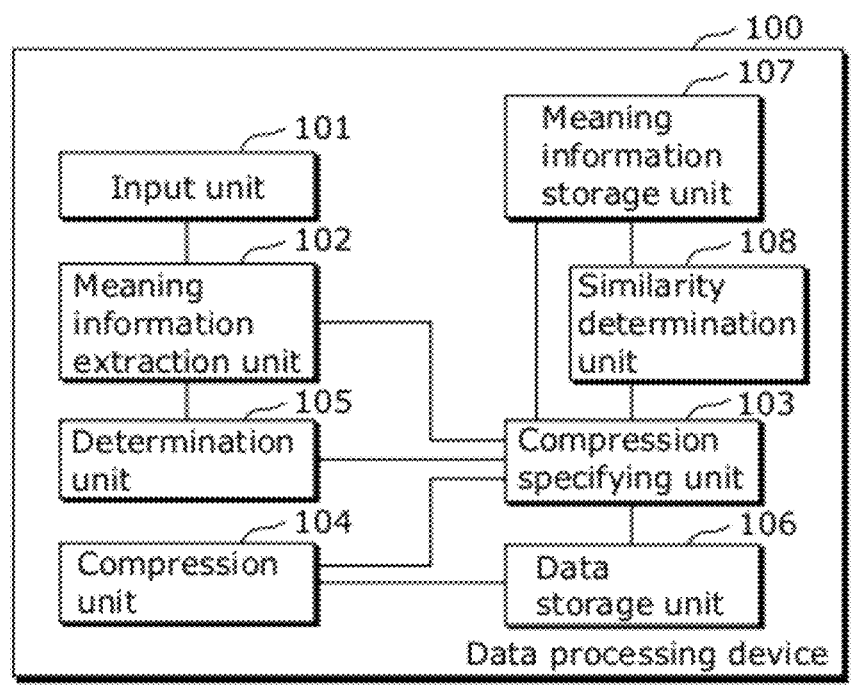
FIG. 15 is a diagram showing an example of attribute information held in a data storage unit in Embodiment 2 of the present invention.
FIG. 16 is a block diagram showing a configuration of the data processing device according to Embodiment 3 of the present invention.

FIG. 14 is a flowchart showing a flow of a data compression process in Embodiment 2 of the present invention. FIG. 15 is a diagram showing an example of attribute information held in the data storage unit 106 in Embodiment 2 of the present invention. Details of the data compression process in Embodiment 2 are discussed below using FIG. 14 and FIG. 15.

The input unit 101 identifies one or more items of image data stored in the data storage unit 106 as the target of processing (herein, N denotes the number of stored image data). Furthermore, the input unit 101 initializes a processing target data pointer n (n=0) (step S301).

The input unit 101 next acquires attribute information for image data pointed by the processing target data pointer n (such as image data name, image data size, image data type as shown in FIG. 15) (step S302). The data processing device 100 then executes the data compression process as described in FIG. 8 for Embodiment 1 discussed above (step S303).

The compression specifying unit 103 then checks whether or not a data compression process has been executed on all the items of the image data stored in the data storage unit 106 (step S304).

If the data compression process has not been executed on any one item of the image data (N at step S304), the input unit 101 adds "1" to the processing target data pointer (step S305).

The data processing device 100 subsequently repeats the process from step S301 to step S304.

On the other hand, when a data compression process has been executed on all the items of the stored image data (Y at step S304), the data compression process is ended.

In this configuration, the data processing device 100 can perform not only a real-time data compression process on image data input from the input unit 101 but also a data compression process on image data stored in the data storage unit 106. The data processing device 100 accordingly can perform data compression during an idle period instead of at the time of data input so that degradation in performance during data input can be reduced.

In this example, the input unit 101 reads all the items of the image data stored in the data storage unit 106 as data to be processed, by varying the processing target data pointer from "0" to "N", that is, the total number of the items of the stored image data. However, the input unit 101 may specify and read out part of the stored image data. Furthermore, the input unit 101 may specify and read out only image data that is selected according to a certain condition.

[Embodiment 3]

Embodiment 3 of the present invention is described next.

The data processing device 100 of Embodiment 3 is different from the data processing device 100 of Embodiment 2 mainly in that it further includes a meaning information storage unit 107 and a similarity determination unit 108. The data processing device 100 of Embodiment 3 is described below mainly in regard to differences from Embodiment 1 or 2.

FIG. 16 is a block diagram showing a configuration of the data processing device 100 according to Embodiment 3 of the present invention. In FIG. 16, the same reference numerals are used for the same components as in FIG. 4 and FIG. 13, and therefore the description thereof is omitted.

As shown in FIG. 16, the data processing device 100 has the meaning information storage unit 107 and the similarity determination unit 108 in addition to the components shown in FIG. 4 and FIG. 13.

The data processing device 100 in Embodiment 3 is, for example, a video recorder or a home server which can store plural items of image data read from an external storage medium in which the image data is stored, or a digital still camera or a digital video camera that can take and store plural still or moving pictures.

The meaning information storage unit 107 stores meaning information. Specifically, the meaning information storage unit 107 stores, as meaning information, sample data representing object images therein, for example.

The similarity determination unit 108 calculates a similarity that indicates similarity between meaning information extracted by the meaning information extraction unit 102 and meaning information stored in the meaning information storage unit 107. Specifically, the similarity determination unit 108 calculates a similarity by, for example, comparing an object image indicated by an item of extracted meaning information to stored sample data.

When the meaning information extraction unit 102 extracts plural items of meaning information, the compression specifying unit 103 selects focus meaning information from the items of the meaning information based on similarities calculated by the similarity determination unit 108. Specifically, the compression specifying unit 103 selects, as focus meaning information, the item of the meaning information for which the similarity is largest, from among the plural items of the meaning information extracted.

FIG. 17 is a diagram showing an example of a meaning information storage table stored in the meaning information storage unit 107 in Embodiment 3 of the present invention.

As shown in FIG. 17, ID, meaning information type, name, and the number of data registrations are stored in the meaning information storage table.

The ID is information for identifying meaning information.

The meaning information type is information indicating the type of meaning information. For example, "human" means that an object image corresponding to the meaning information is an image of a person. Note that the meaning information type may indicate kinds of animal, such as "dog" and "cat", for example. In addition, the meaning information type may indicate kinds of flower, such as "rose" and "tulip", for example.

The name indicates the name of meaning information, such as a person's name like "Mike". The name can be registered using meta-information assigned to image data, for example.

The number of data registrations indicates the number of registered items of sample data to be used for similarity determination. That is, the meaning information storage unit 107 stores items of sample data as meaning information such that the items of sample data are associated with the respective IDs stored in the meaning information storage table. Sample data is image data including object images, for example.

Operations of the data processing device 100 thus configured are discussed next.

Figure 19:
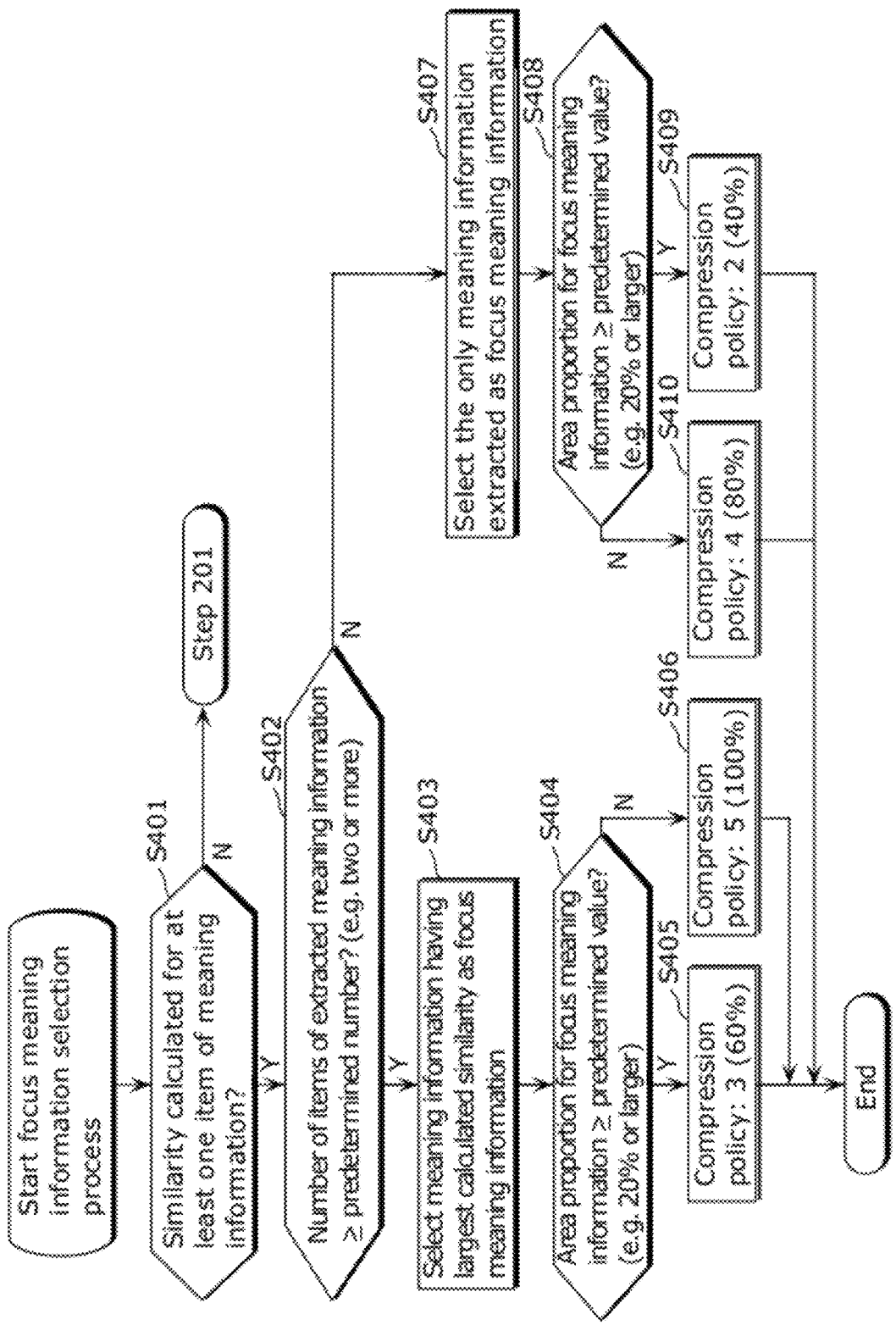
FIG. 19 is a flowchart showing a flow of a focus meaning information selection process in Embodiment 3 of the present invention.

FIG. 18 is a diagram showing an exemplary output of a processing recording table held in the compression specifying unit 103 in Embodiment 3 of the present invention. FIG. 19 is a flowchart showing a flow of a focus meaning information selection process in Embodiment 3 of the present invention. Specifically, FIG. 19 shows another example of processing at step S108 of FIG. 8 used in Embodiment 1 (the process shown in FIG. 10).

The flow of the focus meaning information selection process is described below using FIG. 18 and FIG. 19.

The compression specifying unit 103 first makes an inquiry to the similarity determination unit 108 as to whether or not there is any item of meaning information for which a similarity is calculated among items of meaning information extracted by the meaning information extraction unit 102 (step S401). In response to the inquiry from the compression specifying unit 103, the similarity determination unit 108 references the meaning information storage table held in the meaning information storage unit 107 (FIG. 17), determines whether or not there is an item of meaning information that is similar to the extracted meaning information, and returns the result of the determination to the compression specifying unit 103.

If there is no item of similar meaning information here (that is, if there is no item of meaning information for which a similarity is calculated), the flow proceeds to step S201 of FIG. 10, which has been described for Embodiment 1 (N at step S401).

On the other hand, if even one similarity is calculated in the result of determination returned from the similarity determination unit 108 (Y at step S401), the compression specifying unit 103 determines whether or not the number of items of the meaning information extracted is equal to or larger than a predetermined number (two persons in this example) (step S402).

If the number is equal to or larger than the predetermined number (Y at step S402), the compression specifying unit 103 compares similarities for all the items of meaning information for which similarities has been calculated, and selects, as focus meaning information, the item of the meaning information for which the similarity calculated is largest (step S403).

For example, in Embodiment 1, when the input image A-3 is input, meaning information representing the face region 5 is selected as the focus meaning information because the face region 5 has an area larger than any other face regions as shown in FIG. 9. In Embodiment 3, on the other hand, meaning information representing the face region 3 is selected as the focus meaning information because the face region 3 has the highest similarity among the face regions as shown in FIG. 18.

Note that the meaning information storage table held in the meaning information storage unit 107 holds various parameters as shown in FIG. 17 and is referenced by the similarity determination unit 108 as necessary. For example, the parameters include a meaning information type, which stores "human" indicating that extracted meaning information represents a human, meta-information or a name assigned to extracted meaning information (persons' name such as "Mike" and "Julia" in this example), and the number of items of registered sample data for object images to be used for similarity determination. Thus, the meaning information type of extracted meaning information, the name of a candidate for a similar person, and similarity to that person (a similarity value indicating a result of determination output by the similarity determination unit 108, in percent) are recorded in the processing recording table shown in FIG. 18, in addition to information on position as meaning information shown in FIG. 9 for Embodiment 1.

That is, for the input image A-3, the compression specifying unit 103 selects meaning information indicating the face region 3, which has the highest similarity, as focus meaning information according to the result of determination by the similarity determination unit 108, and determines that the meaning information probably represents the person named "Julia".

Likewise, in Embodiment 1, when the input image A-5 is input, meaning information indicating a face region 2 is selected as focus meaning information because the face region 2 has an area larger than any other face regions according to FIG. 9. In Embodiment 3, on the other hand, meaning information representing a face region 1 is selected as focus meaning information (the person's name is again "Julia") because the face region 1 has the highest similarity among the face regions. Processing at the following steps S404 to S410 is similar to the process shown in FIG. 10 for Embodiment 1, and therefore the description thereof is omitted for Embodiment 3.

In this configuration, the data processing device 100 compares face dictionary data (sample data) on family members and acquaintances stored in a meaning information database with an object image corresponding to extracted meaning information, for example. The data processing device 100 then specifies meaning information corresponding to an object image for which similarity between a face image indicated by face dictionary data and the object image corresponding to the extracted meaning information is highest as focus meaning information. The data processing device 100 then controls the data compression ratio so that the focus meaning information is not lost. The data processing device 100 thus can preferentially prevent loss of meaning information corresponding to a subject which is similar to a subject registered in advance, such as a family member or friend, among plural subjects included in an image.

Note that although in Embodiment 3 the compression specifying unit 103 selects meaning information with the highest similarity calculated as the focus meaning information, the focus meaning information does not necessarily have to be selected in this manner. For example, the compression specifying unit 103 may select, as focus information, meaning information for which a calculated similarity falls within a predetermined range (for example, a face image having 40% or larger area) and which corresponds to an object image having the smallest proportion to the total area of image data. In other words, the compression specifying unit 103 may select, as focus meaning information, the item of the meaning information for which the area proportion is the smallest, from among the items of the meaning information for each of which a similarity calculated by the similarity determination unit 108 is equal to or larger than a threshold.

Being thus configured, the data processing device 100 compares face dictionary data for family members or acquaintances stored in a meaning information database with an object image corresponding to extracted meaning information, for example. The data processing device 100 then specifies, as focus meaning information, meaning information for which a similarity between a face image represented by the face dictionary data and an object image corresponding to extracted meaning information falls within a predetermined range and which corresponds to the smallest object image. The data processing device 100 then controls the data compression ratio so that the focus meaning information is not lost. The data processing device 100 thus can preferentially prevent loss of meaning information even when it has been captured as a secondary subject and has a relatively small area, among plural subjects included in the image, as being meaning information similar to pre-registered meaning information corresponding to, for example, a family member or an acquaintance.

Embodiment 3 has shown an example where when plural items of meaning information are extracted, focus meaning information is selected based on similarity between meaning information extracted from the image and an object image, such as a face image, registered in the meaning information storage table. However, the data processing device 100 does not necessarily have to select the focus meaning information in this manner.

For example, the compression specifying unit 103 may select focus meaning information using closeness between users which can be obtained from social information including closeness, which indicates the degree of closeness between users. Specifically, the compression specifying unit 103 may acquire the closeness between each of the users corresponding to the items of the meaning information and the user corresponding to the data processing device 100 with reference to the social information, and selects focus meaning information from the items of the meaning information based on the acquired closeness. For example, the compression specifying unit 103 may select meaning information having a closeness equal to or larger than a threshold, as focus meaning information.

Here, the user corresponding to an item of meaning information is a user that is retrieved with reference to a meaning information storage table, such as face dictionary data. The user corresponding to the data processing device 100 is, for example, the owner or the user of the data processing device 100.

The data processing device 100 thus can select focus meaning information in accordance with closeness between users by choosing focus meaning information based on social information. This can prevent an image of a user having high closeness to the user operating the data processing device from being lost in compressed image data, for example.

[Embodiment 4]

Embodiment 4 of the present invention is described next.

The data processing device 100 of Embodiment 4 is different from the data processing device 100 of Embodiment 3 mainly in that it further includes a ranking management unit 109. The data processing device 100 of Embodiment 4 is described below mainly in regard to its differences from Embodiment 1, 2, or 3.

Figure 20:
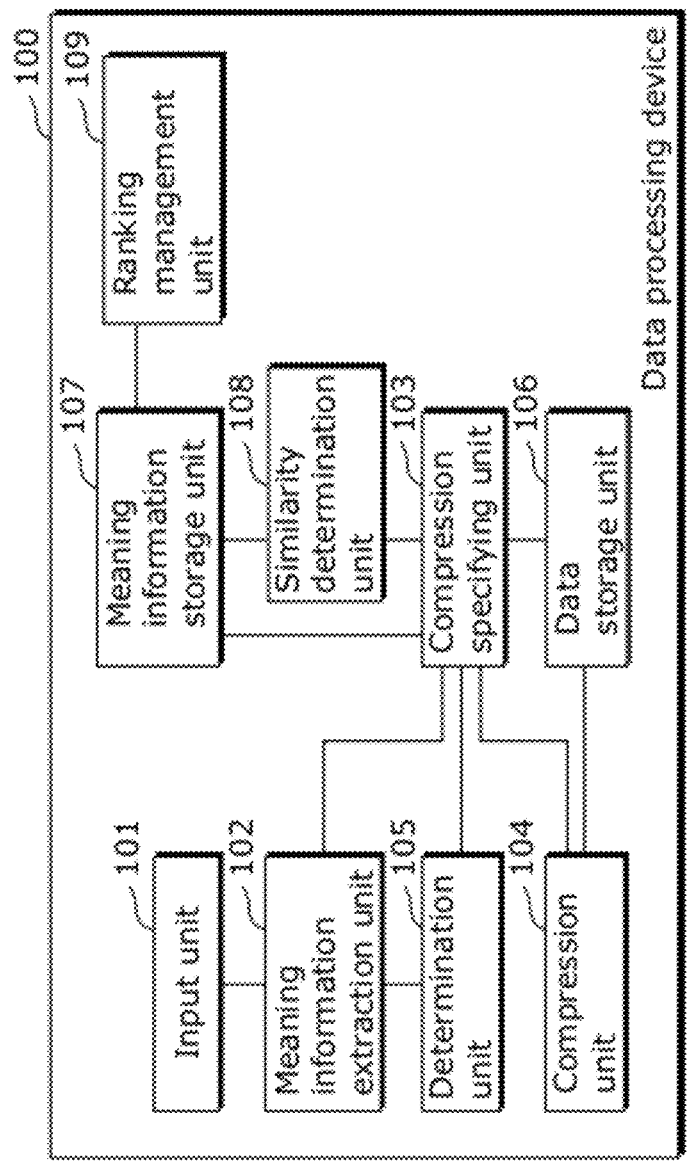
FIG. 20 is a block diagram showing a configuration of the data processing device according to Embodiment 4 of the present invention.

FIG. 20 is a block diagram showing a configuration of the data processing device 100 according to Embodiment 4 of the present invention. In FIG. 20, the same reference numerals are used for the same components as in FIG. 4, FIG. 13, and FIG. 16, and therefore the description thereof is omitted.

As shown in FIG. 20, the data processing device 100 has the ranking management unit 109 in addition to the components shown in FIG. 4, FIG. 13, and FIG. 16.

The data processing device 100 in Embodiment 4 is a video recorder or a home server which can store plural items of image data read from an external storage medium in which the image data is stored, or a digital still camera or a digital video camera that can take and store plural still or moving images, for example.

The ranking management unit 109 analyzes meaning information stored in the meaning information storage table held in the meaning information storage unit 107 in terms of the number of registrations, frequency of occurrence, and trend in occurrence of items therein when meaning information is registered or utilizing an idle period, and assigns ranks to all (or part of) the items of the registered meaning information.

That is, the ranking management unit 109 calculates ranks indicating the significance of the respective items of meaning information based on frequencies of extraction stored in the meaning information storage unit 107. Specifically, the ranking management unit 109 calculates the ranks such that a higher rank (that is, a smaller value) is assigned to an item having a higher frequency of extraction, for example.

FIG. 21 is a diagram showing an example of a meaning information storage table stored in the meaning information storage unit 107 in Embodiment 4 of the present invention. As shown in FIG. 21, in the meaning information storage table of Embodiment 3, the ranks calculated by the ranking management unit 109 are stored in association with the respective items of the meaning information.

Operations of the data processing device 100 thus configured are discussed next.

Figure 22:
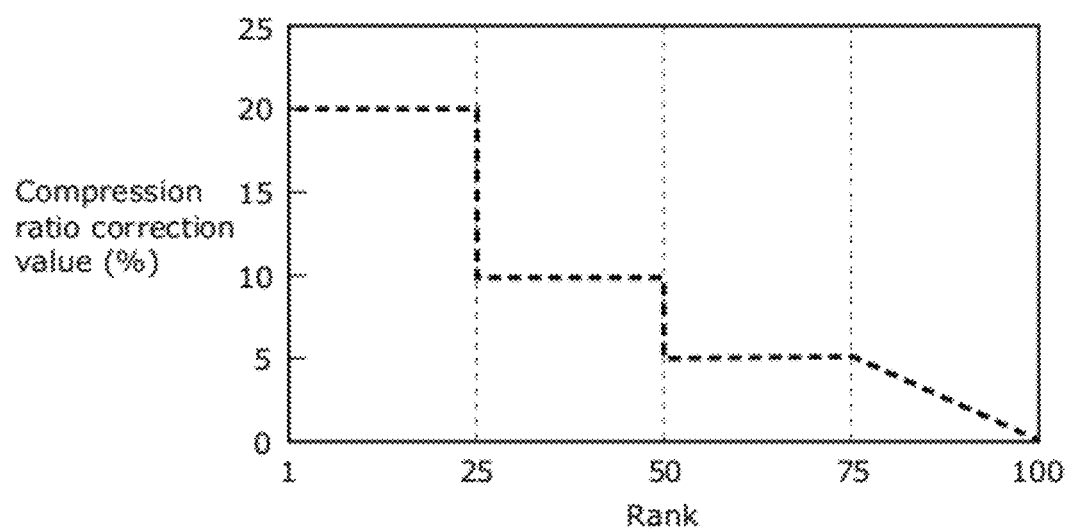
FIG. 22 is a diagram showing an example of a correction value table for data compression ratio held in the compression specifying unit in Embodiment 4 of the present invention.
Figure 23:
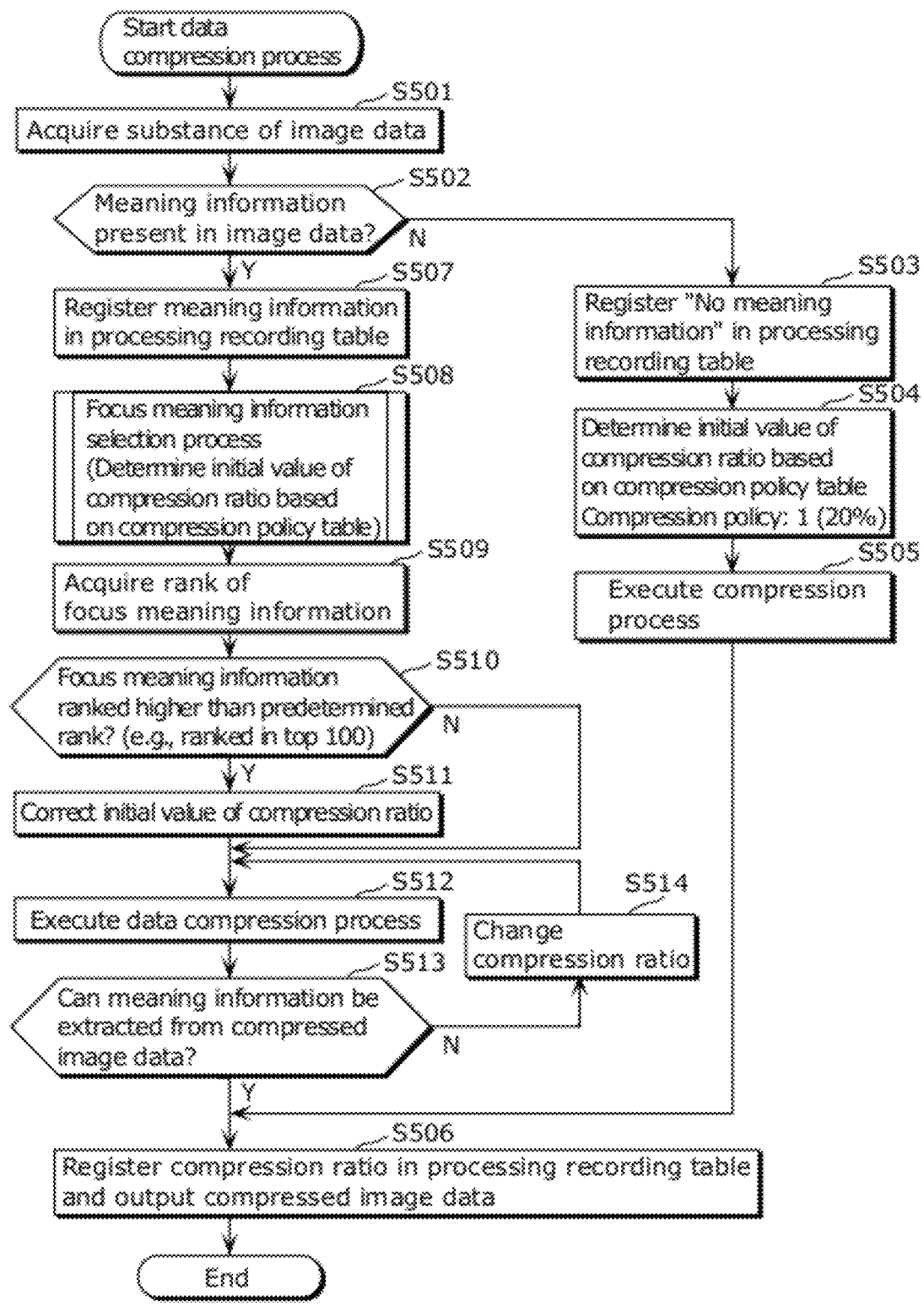
FIG. 23 is a flowchart showing a flow of a data compression process in Embodiment 4 of the present invention.

FIG. 22 is a diagram showing an example of a correction value table for data compression ratio held in the compression specifying unit 103 in Embodiment 4 of the present invention. FIG. 23 is a flowchart showing a flow of a data compression process in Embodiment 4 of the present invention. FIG. 24 is a diagram showing an example of image data compressed by the data processing device 100 of Embodiment 4 of the present invention. Specifically, FIG. 24 is a diagram showing an example of image data and image size resulting from compression process performed on image data input from the input unit 101 with a data compression ratio based on the result of meaning information extraction according to the present invention.

FIG. 23 is a diagram showing another example of the process shown in FIG. 8 used for Embodiment 1. Processing at steps S501 to S508 in FIG. 23 is similar to steps S101 to S108 in FIG. 8, and therefore the description thereof is omitted.

After the processing at step S508, the compression specifying unit 103 acquires the rank associated with the selected focus meaning information via the similarity determination unit 108 (step S509).

The compression specifying unit 103 next determines whether or not the rank of the focus meaning information is a predetermined rank or above (step S510). Here, if the rank is below the predetermined rank (in this example, below the 100th place) (N at step S510), the compression unit 104 executes a data compression process according to the initial value of compression ratio specified in the compression policy table as in Embodiment 1 (step S512). On the other hand, if the rank of the focus meaning information is the predetermined rank or above (the first to 100th place in this example) (Y at step S510), the compression specifying unit 103 acquires a correction value corresponding to the rank of the focus meaning information with reference to the correction value table for data compression ratio held in the compression specifying unit 103. The compression specifying unit 103 then causes the compression unit 104 to execute a data compression process according to the sum of the initial value of compression ratio specified in the compression policy table and the acquired correction value (step S511). That is, the compression specifying unit 103 determines the initial value of compression ratio based on meaning information extracted by the meaning information extraction unit 102 and a rank calculated by the ranking management unit 109.

The following steps S513 and S514 are similar processes to steps S110 and S111 of FIG. 8, and therefore the description thereof is omitted.

Now, a specific example is shown using the input image A-3 as an example. In FIG. 18 for Embodiment 3, meaning information representing a face region 3 is selected as focus meaning information on the ground that meaning information for "Julia" which corresponds to the face region 3 has the highest similarity. At step S510 in Embodiment 4, the compression specifying unit 103 determines whether or not the rank of "Julia", which corresponds to the face region 3 selected, is the predetermined rank or above.

Then at step S511, the compression specifying unit 103 retrieves a correction value (20% in this example) corresponding to the rank of "Julia" of the face region 3 (the second place in this example). The compression specifying unit 103 then changes the initial value of compression ratio (to 80% in this example) by adding the correction value (20%) to the initial value of compression ratio according to the compression policy table (60% in this example). Likewise, for the input images A-2 to A-5 from which meaning information can be extracted, the compression specifying unit 103 can correct the initial value of compression ratio according to the ranks of the items of the meaning information as shown in FIG. 24 (see images D-2 to D-5). Note that when the initial value of compression ratio exceeds 100% as a result of adding a correction value as in the case of the input image A-5, the compression specifying unit 103 uses 100% as the upper limit of data compression ratio.

In this configuration, ranks are assigned to the respective items of stored meaning information based on the number of registrations, frequencies of occurrence, and/or trend in occurrence for the items of the meaning information. The data processing device 100 then adjusts the initial value of compression ratio for image data according to the ranks. This allows the data processing device 100 to finely prioritize items of data that has equivalent attribute information. For example, because a picture in which a family member having a high frequency of extraction as meaning information is highly ranked, the data processing device 100 control a size reduction process so as not to apply excessive reduction to the picture in a data compression process. In other words, quality of compressed image data can be automatically adjusted according to a rank, so that loss of meaning information as a result of excessive compression can be prevented without requiring a directive operation from a user for each item of image data.

In Embodiment 4, correction values for use in correction of data compression ratio rectangularly changes in a stepwise manner as shown in FIG. 22. However, correction values are not limited to this, and various models is applicable, such as a constant value, linearly increasing or decreasing values, or an exponentially increasing or decreasing values. In addition, a start rank or an end rank to which such a model is applied and the initial correction value may be freely configurable.

In addition, although the compression specifying unit 103 in Embodiment 4 adds a correction value to a data compression ratio referenced in the compression policy table according to the rank of the selected focus meaning information, an upper limit to the data compression ratio value may be predetermined according to the ranks (for example, a data compression ratio is not set to be below 60% for the top 100 ranks).

[Embodiment 5]

Embodiment 5 of the present invention is described next.

For permanent management of content including image data, data of content, documents, and the like is typically stored on a personal computer (hereinafter referred to "PC"), a storage medium for an external storage device (for example, a hard disk, hereinafter referred to as "HDD"), or an external storage medium (for example, a disc medium such as a CD-R/DVD or a removable medium such as a SD memory card or a USB memory). It is not, however, easy for the user to permanently keep track of the locations of a large amount of content on his or her own. Furthermore, there is an increasing incidence of loss of important data due to a breakage of equipment, component failure, theft, loss, or a disaster. When content lost is recording of a broadcast program or an application such as a downloaded game, the content can be recovered by purchasing it again, for example. In contrast, private content, such as family pictures, is unique and loss of it causes great damage.

In case of such an accident, there is a demand for a data processing device that manages stored data and backs up the stored data in an auxiliary storage area. The data can be stored with its backup made by such a method as: (1) making redundant data among storage media contained in the data processing device, (2) writing the data from the data processing device into an external storage medium, or (3) making redundant data in a data storage area provided at a location remote from the data processing device (a storage area allocated on a cloud server set up on the data processing device or a data center) via a network. Among these storage methods, data management by the second method is not easy for general users, involving additional management of an external storage medium into which data has been written, and may result in loss of the external storage medium and lead to failure in attain the purpose of backup. Furthermore, with the first and second methods, data is likely to be lost when some disaster occurs at the location where the data processing device is installed. Consequently, remote backup with the third method is expected to be a mainstream for preventing loss of content.

However, because a storage area on a cloud server entails management and operation costs, its unit price generally tends to be higher than that of an HDD or an SSD (Solid State Device) as mass storage media for consumers. Businesses will spare no expense to secure an area equivalent to that of the backup source for backing up business documents that should never be leaked or lost. In contrast, it is unlikely that general users pay much cost for the purpose of backing up private content. They are therefore expected to reserve a storage area of a smaller amount as a backup destination than that of the backup source, such as one-tenth, in order to keep costs low.

Under these circumstances, data processing devices have been proposed that pick and back up only important data when a large storage area is not available in the backup destination.

One conventional data processing device sets a significance of content based on a desired time to start backup selected by the user (for example, a higher significance is set for content for which backup is started within three days than content for which backup is started within a week) when the user registers content to the data processing device. The conventional data processing device backs up data in an external disk area with higher priority on data having a higher significance, thereby preventing loss of important data in case of a disk failure on the data processing device (see PTL 2 (Japanese Unexamined Patent Application Publication Number 2004-295723), for instance).

The data processing device disclosed in PTL 2 displays a screen for the user to select a desired backup start time for setting the significance of each item in content by him or herself. When the user selects a desired backup start time, a predetermined significance level is registered. On the other hand, when the user does not select a desired backup start time (step 22N), no significance level is registered. Then, only the content for which a significance level has been set is backed up as backup target content.

That is, the data processing device disclosed in PTL 2 is based on the premise that only important data is picked and backed up when data storage area available as a backup destination is smaller than that of the backup source. The data processing device disclosed in PTL 2 thus has a problem that the user is required to perform an operation to set significance and a problem that not all the content is backed up from the backup source because a data storage area cannot be effectively used as a backup destination where the size of data is equivalent to that of the data in the backup source.

To address the problems, the data processing device 100 in Embodiment 5 of the present invention includes a backup management unit 110 and an auxiliary storage unit 111 in addition to the components of the data processing device 100 in Embodiment 4. The data processing device 100 of Embodiment 5 is described below mainly in regard to its differences from Embodiment 1, 2, 3, or 4.

Figure 25:
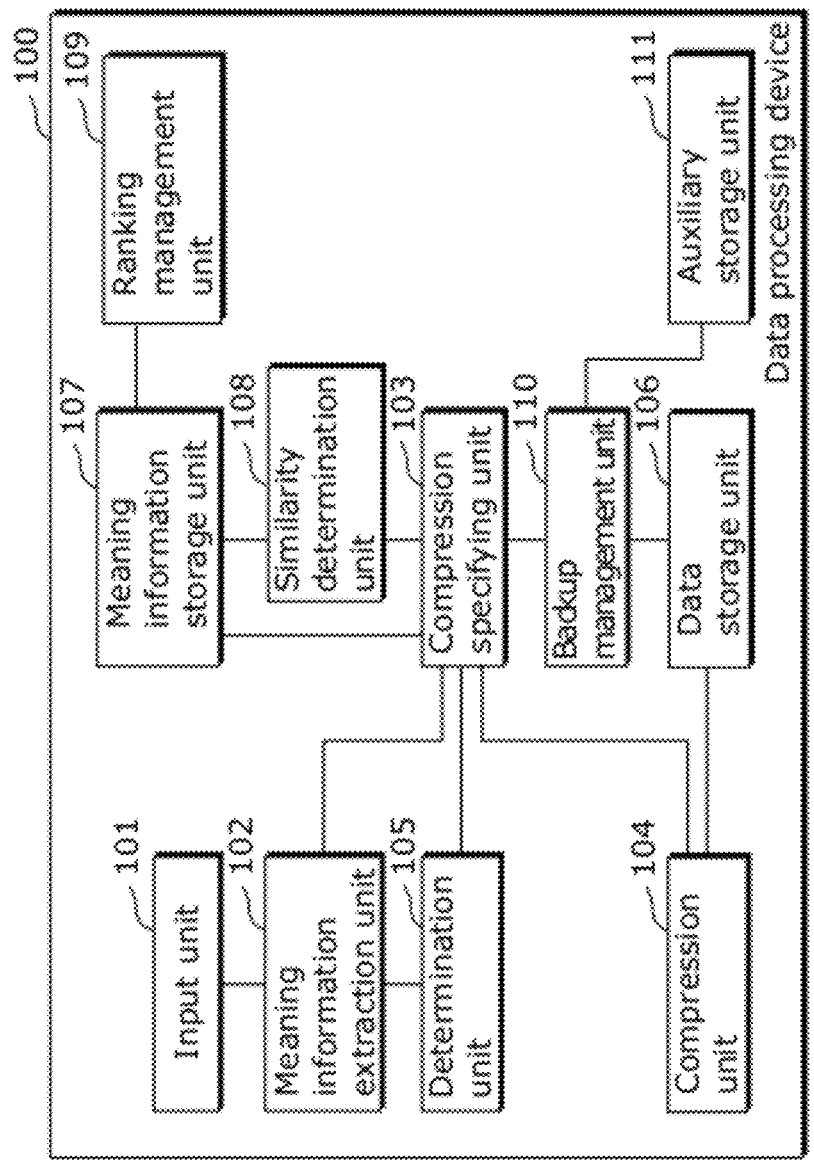
FIG. 25 is a block diagram showing a configuration of the data processing device according to Embodiment 5 of the present invention.

FIG. 25 is a block diagram showing a configuration of the data processing device 100 according to Embodiment 5 of the present invention. In FIG. 25, the same reference numerals are used for the same components as in FIG. 4, FIG. 13, FIG. 16, and FIG. 20, and therefore the description thereof is omitted.

As shown in FIG. 25, the data processing device 100 has the backup management unit 110 and the auxiliary storage unit 111 in addition to the components shown in FIG. 4, FIG. 13, FIG. 16, and FIG. 20.

The data processing device 100 in Embodiment 5 is a video recorder or a home server which can store plural items of image data read from an external storage medium in which the image data is stored, or a digital still camera or a digital video camera that can take and store plural still or moving pictures, for example.

The backup management unit 110 manages compressed image data output from the compression specifying unit 103 as backup data of image data stored in the data storage unit 106. Specifically, the backup management unit 110 saves compressed image data output from the compression specifying unit 103 in the auxiliary storage unit 111 as backup data.

The auxiliary storage unit 111 is a storage medium, such as a hard disk, for storage of the backup data.

The compression specifying unit 103 determines the initial value of compression ratio according to the ratio of the storage capacity of the data storage unit 106 to the storage capacity of the auxiliary storage unit 111.

FIG. 26 is a diagram showing an example of capability information acquired by the compression specifying unit 103 in Embodiment 5 of the present invention. FIG. 27 is a flowchart showing a flow of a backup process in Embodiment 5 of the present invention. Specifically, FIG. 27 is a diagram showing another example of the process of FIG. 14 that is used for Embodiment 2.

The flow of processing is described below using FIG. 26 and FIG. 27.

The backup management unit 110 first identifies one or more items of image data stored in the data storage unit 106 (herein, N denotes the number of items of stored data) as backup target image data. Furthermore, the backup management unit 110 initializes a processing target data pointer (n=0) (step S601).

The backup management unit 110 next retrieves capability information that indicates the capability of the auxiliary storage unit 111 (for example, total storage capacity and remaining storage capacity) from the auxiliary storage unit 111. The backup management unit 110 then transfers the capability information for the auxiliary storage unit 111, which will be the backup destination, and capability information for the data storage unit 106, which is the backup source, to the compression specifying unit 103 (step S602). Upon receiving the two items of capability information, the compression specifying unit 103 compares the capability information for the backup source to that for the backup destination, and modifies the compression policy table according to the difference in capability therebetween (step S603).

Specifically, as shown in FIG. 26, it is assumed that the total storage capacity of the data storage unit 106 serving as the backup source is 2,000 gigabytes (GB) and the total storage capacity of the auxiliary storage unit 111 as the backup location is 1,000 GB, for example. Therefore, the difference in capability in terms of storage capacity ratio is 2:1, that is, the capacity of the backup destination is a half. It is further assumed that backup has not been carried out yet on the data processing device 100 with 50,000 items of image data being stored in the backup source, and its used storage capacity is 1,000 GB. Backup is available by simple reproduction at this point because the auxiliary storage unit 111 as the backup destination is unused and its remaining storage capacity is 1,000 GB, but it will use up the remaining storage capacity. Thus, the compression specifying unit 103 in Embodiment 5 halves the compression ratio in the compression policy table according to the total storage capacity ratio of 2:1, which shows the difference in capability between backup source and backup destination. In other words, the compression specifying unit 103 determines the initial value of compression ratio according to the ratio between the storage capacity of the data storage unit 106 and the storage capacity of the auxiliary storage unit 111.

The compression specifying unit 103 then retrieves attribute information for image data representing processing target data, n (step S604), and executes any of the data compression processes described in Embodiments 1 to 4 using the compression policy table modified according to the difference in capability at step S603 (step S605).

Furthermore, the backup management unit 110 registers the image data on which a compression process has been executed by the compression unit 104 in a data transfer queue (step S606). That is, the backup management unit 110 manages compressed image data output from the compression specifying unit 103 as backup data.

Then, the compression specifying unit 103 checks whether or not a data compression process has been executed on all the items of the image data N stored in the data storage unit 106 (step S607).

If the data compression process has not been executed on any one item of the image data (N at step S607), the processing target data pointer is incremented by one (step S608). The data processing device 100 subsequently repeats the process from step S604 to step S607.

On the other hand, when a data compression process has been executed on all the items of the stored image data (Y at step S607), the data compression process is ended. The backup management unit 110 is then notified of completion of the data compression process. Finally, the backup management unit 110 transfers the backup data registered in the data transfer queue to the auxiliary storage unit 111 (step S609). That is, the backup management unit 110 saves backup data in the auxiliary storage unit 111.

In this configuration, the data processing device 100 determines the compression ratio for each item of image data, and executes backup the image data according to the difference in capability between the backup source and the backup destination and condition of meaning information included in each item of the image data. The data processing device 100 therefore can back up image data such that, for example, the size of an image including a face is reduced to the furthest extent at which the face is not blurred and that an image showing a scene or the like to a predetermined size or to the minimum. Furthermore, when plural items of image data are to be backed up, the data processing device 100 can reduce the storage capacity for backup through automatic image quality adjustment based on condition of meaning information, without requiring a directive operation for each item of image data from a user.

The data processing device 100 also adjusts data compression ratio in consideration of the difference in capacity between a storage area in which data to be backed up is stored and a storage area of a backup destination. The data processing device 100 thus can back up the entire image data stored in the data storage unit 106. As a result, even if the entire image data in the backup source is lost, the data processing device 100 can recover the lost image data from backup image data so that loss of meaning information of all the items of the image data stored in the data storage unit 106 can be prevented.

[Embodiment 6]

Embodiment 6 of the present invention is described next.

The data processing device 100 of Embodiment 6 is different from the data processing device 100 of Embodiment 5 mainly in that it further includes a communication unit 112 for communicating with a first external device 300 connected via a network 200 and that an auxiliary storage unit 302 is included in the first external device 300. The data processing device 100 of Embodiment 6 is described below mainly in regard to its differences from Embodiment 1.

Figure 28:
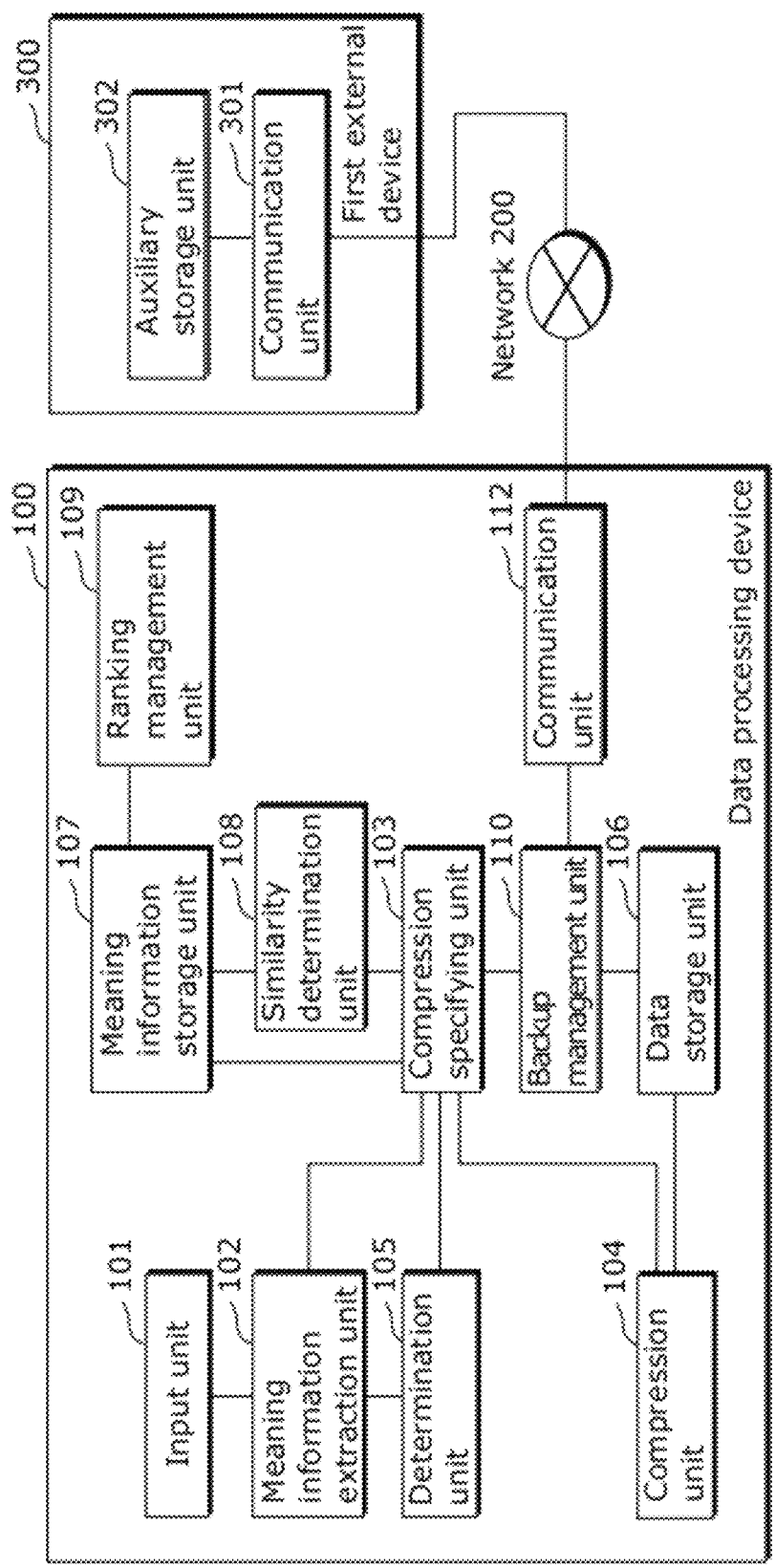
FIG. 28 is a block diagram showing a configuration of the data processing device according to Embodiment 6 of the present invention.

FIG. 28 is a block diagram showing a configuration of the data processing device 100 according to Embodiment 6 of the present invention. In FIG. 28, the same reference numerals are used for the same components as in FIG. 4, FIG. 13, FIG. 16, FIG. 20, and FIG. 25, and therefore the description thereof is omitted.

As shown in FIG. 28, the data processing device 100 has the communication unit 112 in addition to the components shown in FIG. 4, FIG. 13, FIG. 16, FIG. 20, and FIG. 25. The first external device 300 connected with the data processing device 100 via the network 200 has a communication unit 301 and the auxiliary storage unit 302.

The data processing device 100 of Embodiment 6 is a video recorder or a home server which can store plural items of image data read from an external storage medium in which the image data is stored, or a digital still camera or a digital video camera that can take and store plural still or moving pictures, for example.

The communication unit 112 communicates with the first external device 300 connected via the network 200.

The flow of a backup process in Embodiment 6 is similar to the flow shown in FIG. 27 and described in Embodiment 5 except that the communication unit 112 and the communication unit 301 shown in FIG. 28 are connected via the network 200, and therefore the description thereof is omitted.

In this configuration, backup data is saved on an external device that is connected with the data processing device 100 via a network. This enables the data processing device 100 to save backup of content stored in a home device on a remote backup server, for example. Consequently, even if image data at the backup source is lost due to some failure or disaster, the data processing device 100 can retrieve compressed image data from backup image data from the remote server, which can reduce risk of data loss. Furthermore, because a data compression process (or size reduction process) is performed on the side of the data processing device, which is the backup source, before data transfer, the data processing device 100 can reduce the amount of data transferred in a communication process over a network.

[Embodiment 7]

Embodiment 7 of the present invention is described next.

Figure 29:
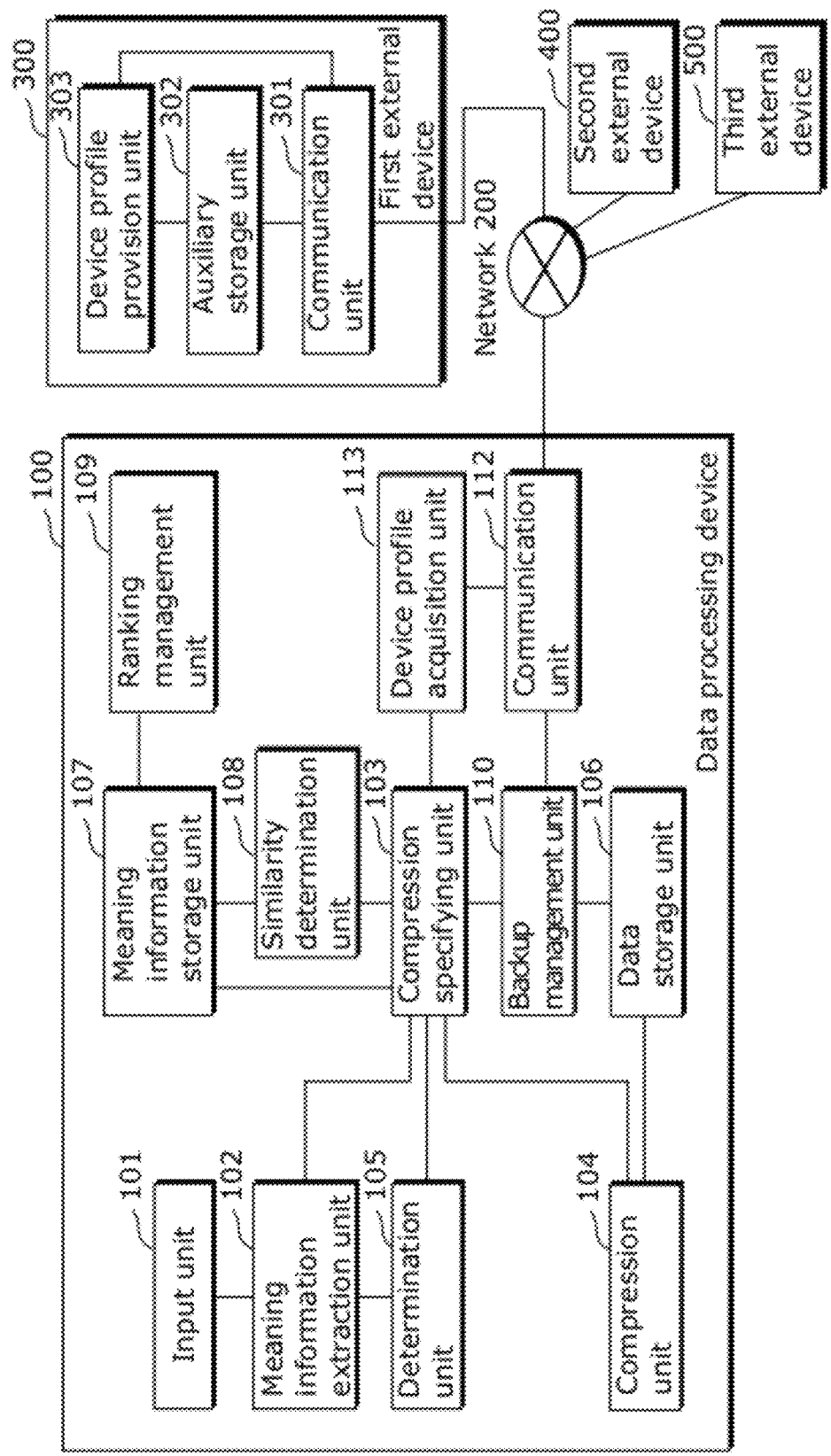
FIG. 29 is a block diagram showing a configuration of the data processing device according to Embodiment 7 of the present invention.

FIG. 29 is a block diagram showing a configuration of the data processing device 100 according to Embodiment 7 of the present invention. In FIG. 29, the same reference numerals are used for the same components as in FIG. 4, FIG. 13, FIG. 16, FIG. 20, FIG. 25, and FIG. 28, and therefore the description thereof is omitted.

In FIG. 29, the data processing device 100 has a device profile acquisition unit 113 in addition to the components shown in FIG. 4, FIG. 13, FIG. 16, FIG. 20, FIG. 25, and FIG. 28. The first external device 300 connected with the data processing device 100 via the network 200 further has a device profile provision unit 303. A second external device 400 and a third external device 500 which are connected with the data processing device 100 via the network 200 have similar components to those of the first external device 300.

The data processing device 100 in Embodiment 7 is a video recorder or a home server which can store plural items of image data read from an external storage medium in which the image data is stored, or a digital still camera or a digital video camera that can take and store plural still or moving pictures, for example.

The device profile acquisition unit 113 acquires device profiles indicating the capability of the first to third external devices 300, 400, and 500 via the communication unit 112.

FIG. 30 is a diagram showing an example of capability information acquired by the compression specifying unit 103 in Embodiment 7 of the present invention.

The flow of processing is described below using FIG. 27 and FIG. 30.

The flow of backup process in Embodiment 7 is similar to the flow shown in FIG. 27 described for Embodiment 5. In Embodiment 7, however, processing at step S602 is different from that described for Embodiment 5.

Specifically, in Embodiment 5, the backup management unit 110 acquires capability information for the auxiliary storage unit 111 at step S602 and transfers the capability information to the compression specifying unit 103 with capability information for the data storage unit 106.

On the other hand, in Embodiment 7, the backup management unit 110 transfers only capability information for the data storage unit 106 to the compression specifying unit 103. The compression specifying unit 103 then requests the device profile acquisition unit 113 to acquire capability information for external devices having the auxiliary storage unit 302. Upon receiving the request, the device profile acquisition unit 113 sends a device profile acquisition request to the external devices connected via the communication unit 112 and the network 200 (the first to third external devices 300, 400, and 500 in this example). On the first external device 300, for example, the communication unit 301 receives the device profile acquisition request over the network 200 and transfers the request to the device profile provision unit 303 which can receive the request. The device profile provision unit 303 analyzes the device profile acquisition request received, and, when determining that the request should be responded to, generates the latest device profile with reference to the status of the auxiliary storage unit 302, for example. The device profile provision unit 303 then sends the generated device profile back to the data processing device 100 in response to the device profile acquisition request.

Here, a device profile refers to capability information concerning an external device. Specifically, a device profile includes at least one of storage capability information, communication capability information, and display capability information. More specifically, a device profile is information including communication capability information for the communication unit 301 of the first external device 300 (for example, line transmission rate, recommended communication time period, and trend in communication congestion) and display capability information of a display unit (not shown in FIG. 29) of the first external device 300 (for example, screen size, resolution, moving picture reproduction frame rate), in addition to storage capability information for the auxiliary storage unit 302 of the first external device 300 (for example, total storage capacity, remaining storage capacity, maximum write data size, and writing speed), for example.

On the other hand, the device profile acquisition unit 113 of the data processing device 100 transfers the device profile returned from the device profile provision unit 303 to the compression specifying unit 103. The compression specifying unit 103 holds the device profile acquired in the response from the device profile acquisition unit 113 in a table within the compression specifying unit 103 as shown in FIG. 30. In FIG. 30, device profiles are acquired from the first to third external devices 300, 400, and 500.

The compression specifying unit 103 then compares the backup source and the backup destination in capability and modifies values in the compression policy table according to the difference in capability therebetween as in the flow of processing at steps S602 and S603 in FIG. 27 for Embodiment 5. The compression specifying unit 103 further controls execution of backup depending on content of the device profiles at step S609.

Here, a specific example of changing values in the compression policy table according to the difference in capability is shown.

<An Example where the First external Device 300 has an Equivalent Total Storage Capacity and a Specified Recommended Communication Time Period>

The first external device 300 is a home server placed in a home, for example. That is, the first external device 300 serves as an extended storage device for the data storage unit 106, which is the backup source, and they are connected by a local area network. The first external device 300 has a total storage capacity of 2,000 GB, which is equivalent to the total storage capacity of the data storage unit 106, and the remaining storage capacity of the first external device 300 is also 2,000 GB (that is, the first external device 300 is unused).

In this case, the data processing device 100 could back up the 50,000 items of image data (1,000 GB in total) stored in the data storage unit 106 without data compression because there is no difference in capability in terms of storage capacity. However, allowing for use of the storage capacity of the first external device 300 for other purposes as a home server, image data is compressed using a standard compression ratio stored in the compression policy table as an initial value.

However, the device profile of the first external device 300 indicates that the communication line transmission rate of the first external device 300 is half that of the data processing device 100, that is, the backup source, and a recommended communication time period is specified. The data processing device 100 thus performs backup in the time period from midnight to 10 a.m. Note that although the screen size of the first external device 300 is smaller than that of the data processing device 100 in this example, the data processing device 100 does not modify values in the compression policy table according to the difference in capability in terms of screen size from the viewpoint of serving as an extension storage device.

<An Example Where the Second External Device 400 is an Online Storage Having a One-Fourth Total Storage Capacity and a Maximum Write Data Size of 1 GB>

The second external device 400 is an online storage on a cloud server connected via the network 200, for example. That is, the second external device 400 serves as a remote storage for the data storage unit 206, which is the backup source, and they are connected by the Internet.

The second external device 400 has a total storage capacity of 500 GB, that is, one-fourth that of the data storage unit 106, and the remaining storage capacity of the device 400 is also 500 GB (that is, the second external device 400 is unused).

In this case, the capability ratio therebetween is 4:1. The data processing device 100 thus cannot simply store the 50,000 items of image data (1,000 GB in total) stored in the data storage unit 106 into the second external device 400. The compression specifying unit 103 therefore modifies the value of compression ratio stored in the compression policy table to one-fourth according to the capability ratio of 4:1. Furthermore, as the maximum write data size is limited to 1 GB, the data processing device 100 applies data compression process such that the size of compressed image data is under the upper limit of 1 GB, when any of the items of the image data stored in the data storage unit 106 exceeds 1 GB.

The backup management unit 110 executes backup during the time period from midnight to 5 a.m., which is the recommended communication time period, avoiding data transfer process during the time period from 10 to 22 when traffic tends to be heavy.

<An Example Where the Third External Device 500 is a Terminal with a Total Storage Capacity of One-Twentieth and Has a Very Small Screen Size>

The third external device 500 is a mobile terminal connected via a home wireless network or a mobile communication network, for example. That is, the third external device 500 serves as a storage for a user to temporarily carry image data outside the home, for the data storage unit 306, which is the backup source. Note that when image data is backed up on the third external device 500, the user can view the image data stored in a storage in a third storage device at any time even when the third external device 500 is off-line.

The third external device 500 has a total storage capacity of 100 GB, that is, one-twentieth of that of the data storage unit 106, and a remaining storage capacity of 80 GB (that is, the third external device 400 is partly used).

In this case, the capability ratio therebetween is 20:1. The data processing device 100 thus cannot simply store the 50,000 items of the image data (1,000 GB in total) stored in the data storage unit 106 into the third external device 500. The compression specifying unit 103 therefore modifies the value of compression ratio stored in the compression policy table to one-twentieth according to the capability ratio of 20:1. In addition, when the difference in display capability is above a predetermined range (for example, ten-fold or larger), the data processing device 100 applies a data compression process on image data to be backed up based on the screen size, resolution, or a reproduction frame rate for moving picture of the third external device 500.

In this configuration, the data processing device 100 changes the initial value of data compression ratio in accordance with processing capability or a device status described in the device profile of an external device. This enables the data processing device 100 to perform such control to halve the compression efficiency, that is, compress image data with a twofold higher image quality when a capacity available for backup increases twofold according to the device status of the external device, for example. In other words, the data processing device 100 can respond to change in capacity of a storage destination, so that efficient backup can be achieved with less formation of unused area.

Furthermore, when the size of an output screen can be obtained as processing capability of an external device, the data processing device 100 can select a data compression method optimized to the processing capability (the output screen size), and thus can avoid saving of data too large for the processing capability and reduce excessive use of storage area.

Note that although in Embodiment 7 the device profile acquisition unit 113 successively acquires device profiles from the first to third external devices 300, 400, and 500 which are connected via the network 200, the way of acquisition is not limited thereto. For example, the user may specify an external device from which the device profile acquisition unit should acquire a device profile. It is also possible that the device profile provision unit 303 of the first external device 300 includes a list of the second external device 400 and the third external device 500 which are capable of cooperative operation with the first external device 300 in a device profile to return to the data processing device 100, for example. Alternatively, the data processing device 100 may select only external devices that can send back its device profile over the network 200 as external devices available for backup through broadcast communication by the communication unit 112, for example.

Note that although the compression specifying unit 103 backs up all the items of image data stored in the data storage unit 106 to the third external device 500 as the backup destination in Embodiment 7, selection of data to be backed up is not limited thereto. For example, when the device type of the third external device 500 is "mobile device" and is determined to be not suited for permanent backup, the data processing device 100 may perform control such that important items, such as data that the user wants to view even off-line, is preferentially backed up. In other words, the data processing device 100 may preferentially back up items of image data for which similarity between extracted meaning information and stored meaning information is high and which corresponds to a high rank determined by the ranking management unit 109.

[Embodiment 8]

Embodiment 8 of the present invention is described next.

Figure 31:
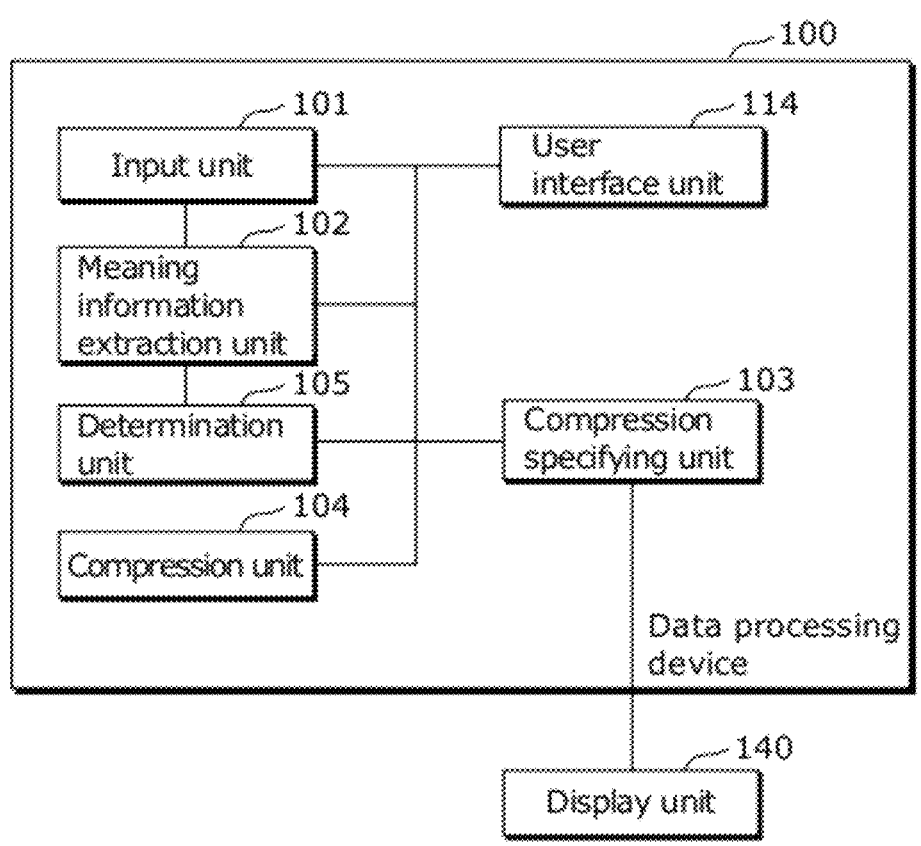
FIG. 31 is a block diagram showing a configuration of the data processing device according to Embodiment 8 of the present invention.

FIG. 31 is a block diagram showing a configuration of the data processing device 100 according to Embodiment 8 of the present invention. FIG. 32 is a diagram for illustrating the operation of the data processing device 100 in Embodiment 8 of the present invention. In FIG. 31, the same reference numerals are used for the same components as in FIG. 4, FIG. 13, FIG. 16, FIG. 20, FIG. 25, FIG. 28, and FIG. 29, and therefore the description thereof is omitted where appropriate.

As shown in FIG. 31, the data processing device 100 has a user interface unit 114 in addition to the components shown in FIG. 4.

The user interface unit 114 is an input unit such as a touch panel or a mouse, receiving input of a specified value for compression ratio from a user. For example, as shown (a) and (b) in FIG. 32, the user moves the upper right corner of an image to lower left. As a result, the user interface unit 114 receives the screen size after compression from the user as the specified value of compression ratio.

The compression specifying unit 103 changes the compression ratio to the specified value received by the user interface unit 114. That is, the compression specifying unit 103 changes the current compression ratio to a compression ratio with which compression efficiency is higher in order to generate compressed image data for which whether or not meaning information can be extracted is determined.

The compression unit 104 compresses image data with the changed compression ratio to generate compressed image data. Then, the determination unit 105 determines whether or not the meaning information can be extracted from the generated compressed image data.

When it is determined that the meaning information can be extracted from the image data compressed with the changed compression ratio, the compression specifying unit 103 outputs the compressed image data to the display unit 140. That is, compressed image data is displayed as shown in (b) in FIG. 32.

When it is determined that the meaning information cannot be extracted from the image data compressed with the changed compression ratio, the compression specifying unit 103 outputs the last compressed image data from which it has been determined that the meaning information can be extracted to the display unit 140, which may be a liquid crystal display, a touch panel, or the like. In other words, the compression specifying unit 103 inhibits further compression of the image data. For example, if the meaning information cannot be extracted when the image data is compressed further than the compressed image data shown in (b) in FIG. 32, the image data is not compressed any further than the compressed image data shown in (b) in FIG. 32. Note that in this situation the compression specifying unit 103 may output warning information indicating that further compression is impossible on the display unit 140.

At this point, the user interface unit 114 receives clipping information for clipping part of the image region of the output compressed image data from the user. That is, when it is determined that the meaning information cannot be extracted from image data compressed with a changed compression ratio, the user interface unit 114 receives input of clipping information from the user. This means that the user interface unit 114 changes an input mode from compression mode in which the user interface unit 114 receives input of a specified value for compression ratio to trimming mode in which the user interface unit 114 receives input of clipping information.

As shown in (b) and (c) in FIG. 32, for example, the user can input clipping information by moving the upper right corner of the image to lower left. That is, the user may input the image size after clipping as clipping information.

The compression unit 104 clips part of the image region of the compressed image data according to the clipping information received by the user interface unit 114. For example, the compression unit 104 may clip part of the image region of the compressed image data so that a region corresponding to extracted meaning information is included in the clipped part. When plural items of the meaning information have been extracted, for example, the compression unit 104 may clip part of the image region of the compressed image data so that a region corresponding to the focus meaning information is included in the clipped part.

It is assumed that in (c) in FIG. 32 images of four persons' faces have been extracted as meaning information and the face images of the two in the center are selected as the focus meaning information. In this case, part of the image region is clipped so as to include the face images of the two persons in the center.

The part of image region of compressed image data thus clipped is output to the display unit 140 by the compression specifying unit.

As described above, the data processing device 100 according to Embodiment 8 can output compressed image data according to the result of determination as to whether or not the meaning information can be extracted when input of a specified value for compression ratio is received from the user. This can prevent loss of meaning information which is included in an uncompressed image, in a compressed image in output compressed image data.

The data processing device 100 is also capable of receiving input of clipping information from the user when it is determined that the meaning information cannot be extracted. It is therefore possible to reduce image size so that meaning information is not lost in output compressed image data and limit the amount of data.

Although the data processing device 100 is described in Embodiments 1 to 8 as being a video recorder, a home server, a digital still camera, and a digital video camera as an example, products to which the data processing device is applicable are not limited to them. The present invention can be generally applied to products that allow input or storage of image data, such as a personal computer, an enterprise computer (a work station), a digital television receiver with image data loading functions, a set top box, a car navigation system, a projector, a mobile terminal, a music component, a digital photo frame, a remote control terminal for device control, and the like.

Although image data handled by the data processing device 100 in Embodiments 1 to 8 is described mainly as being still pictures, the image data is not limited to data of still picture and may be data of moving picture. In this case, processing such as correction of moving picture reproduction size, modification of frame rate, modification by frame thinning, reduction in resolution of regions other than the focus meaning information, reduction in resolution of scenes other than a scene where meaning information of interest appears in time line, or the like, may be applied for modification of compression ratio according to the compression policy table.

While the embodiments of the present invention are described above, the present invention is not limited to the embodiments. Rather, various modifications may be made and components described in Embodiments 1 to 8 can be combined as appropriate.

Part or all of the components described in Embodiments 1 to 8 may be implemented as a large-scale integration (LSI), which is an integrated circuit. For example, a system LSI 150 may include the input unit 101, the meaning information extraction unit 102, the compression specifying unit 103, the compression unit 104, and the determination unit 105 as shown in FIG. 4. These components may be implemented in a single chip or a single chip may include all or part of the components. Although an expression "LSI" is used herein, designations such as IC (Integrated Circuit), system LSI, super LSI, or ultra-LSI may be used depending on the level of circuit integration. Furthermore, the technique for the implementation in an integrated circuit is not limited to formation of an LSI, and the components may be implemented in a dedicated circuit or a generic processor as an integrated circuit. In addition, the components may be implemented in a field programmable gate array (FPGA), which allows post-manufacture programming, or a reconfigurable processor LSI, which allows post-manufacture reconfiguration of connection and setting of circuit cells therein. Alternatively, operations by these functional blocks may be performed using a digital signal processor (DSP) or a central processing unit (CPU), for example. Moreover, these processing steps may be carried out by recording the steps as a program on a recording medium and executing the steps recorded as a program on a recording medium.

Furthermore, if an integrated circuit technique that replaces LSIs emerges with advances of semiconductor technology or from other derivative technologies, that technique may be used for integration of the functional blocks as a matter of course. For example, application of biotechnology is conceivable.

Furthermore, the present invention can be implemented as a data processing method which includes operations of the characteristic components of the data processing device as its steps. The present invention can also be implemented as a program for causing a computer having a CPU, a random access memory (RAM) and so forth to execute the steps included in the data processing method. It goes without saying that such a program can be distributed via a recording medium such as a CD-ROM, or a transmission medium such as the Internet.

INDUSTRIAL APPLICABILITY

The data processing device according to an aspect of the present invention is advantageous for application to a video recorder, a home server, a digital still camera, a digital video camera, a personal computer, an enterprise computer (a work station), a digital television receiver with image data loading functions, a set top box, a car navigation system, a projector, mobile terminal, a music component, a digital photo frame, a remote control terminal for device control, and the like that have functions to analyze meaning information characterizing image data and apply compression on image data without loss of extracted meaning information and that efficiently compress and store input or stored image data.

In addition, due to saving of compressed data in an auxiliary storage area, the data processing device is also applicable to uses such as backup against accidents.

REFERENCE SIGNS LIST

100 Data processing device
101 Input unit
102 Meaning information extraction unit
103 Compression specifying unit
104 Compression unit
105 Determination unit
106 Data storage unit
107 Meaning information storage unit
108 Similarity determination unit
109 Ranking management unit
110 Backup management unit
111, 302 Auxiliary storage unit
112, 301 Communication unit
113 Device profile acquisition unit
114 User interface unit
140 Display unit
150 System LSI
200 Network
300 First external device
303 Device profile provision unit
400 Second external device
500 Third external device

The invention claimed is:
1. A data processing device which compresses image data, said data processing device comprising:
an input unit configured to acquire image data;
a meaning information extraction unit configured to extract meaning information indicating a feature of an object image included in an image represented by the image data
a compression specifying unit configured to determine an initial value of a compression ratio which indicates a level of compression efficiency;
a compression unit configured to compress the image data according to the initial value of the compression ratio determined by said compression specifying unit to generate compressed image data and
a determination unit configured to determine whether or not the meaning information extracted by said meaning information extraction unit can be extracted from the compressed image data generated by said compression unit,
wherein said compression specifying unit is further configured to change the compression ratio from the initial value according to a result of the determination by said determination unit,
when said compression specifying unit changes the compression ratio, said compression unit is further configured to compress the image data according to the changed compression ratio to newly generate compressed image data,
when said meaning information extraction unit extracts plural items of the meaning information, said compression specifying unit is configured to select focus meaning information from the items of the meaning information based on an area of an object image corresponding to each of the items of meaning information,
said determination unit is configured to determine whether or not the focus meaning information can be extracted from the compressed image data generated by said compression unit, and
when said meaning information extraction unit extracts the plural items of the meaning information, said compression specifying unit is configured to select, as the focus meaning information, one of the items of meaning information for which a proportion of the area of the corresponding object image to an area of the image represented by the image data is largest.

2. The data processing device according to claim 1,
wherein when said determination unit determines that the meaning information cannot be extracted, said compression specifying unit is configured to change the compression ratio so as to reduce the compression efficiency until said determination unit determines that the meaning information can be extracted, and when said determination unit determines that the meaning information can be extracted, said compression specifying unit is configured to output compressed image data which said determination unit determines that the meaning information can be extracted from.

3. The data processing device according to claim 1,
wherein when said determination unit determines that the meaning information can be extracted, said compression specifying unit is configured to change the compression ratio so as to increase the compression efficiency until said determination unit determines that the meaning information cannot be extracted, and when said determination unit determines that the meaning information cannot be extracted, said compression specifying unit is configured to output last compressed image data which said determination unit has determined that the meaning information can be extracted from.

4. The data processing device according to claim 1,
wherein said compression specifying unit is configured to determine the initial value of the compression ratio based on the meaning information extracted by said meaning information extraction unit.

5. The data processing device according to claim 1, further comprising
a data storage unit storing image data,
wherein said input unit is configured to acquire the image data by reading the image data from said data storage unit.

6. The data processing device according to claim 5, further comprising
a backup management unit configured to manage the compressed image data generated by said compression unit as backup data of the image data stored in said data storage unit.

7. The data processing device according to claim 6, further comprising
a communication unit configured to communicate with at least one external device via a network,
wherein the at least one external device includes an auxiliary storage unit in which the backup data is stored, and
said backup management unit is configured to save the backup data in the auxiliary storage unit via said communication unit.

8. The data processing device according to claim 7, further comprising
a device profile acquisition unit configured to acquire a device profile indicating a capability of the external device via said communication unit,
wherein said compression specifying unit is configured to determine the initial value of the compression ratio based on the meaning information extracted by said meaning information extraction unit and the device profile acquired by said device profile acquisition unit.

9. The data processing device according to claim 8,
wherein the device profile includes a storage capacity of the auxiliary storage unit, and
said compression specifying unit is configured to determine the initial value of the compression ratio based on the meaning information extracted by said meaning information extraction unit and a capacity ratio between the storage capacity of the auxiliary storage unit included in the device profile and a storage capacity of said data storage unit.

10. The data processing device according to claim 1,
wherein said meaning information extraction unit is configured to extract, as the meaning information, person information indicating a face position, a face area, a facial expression, a posture, or a gesture of a person image included in the image, character information indicating content of a character image included in the image, or object information indicating a type of an object image included in the image.

11. The data processing device according to claim 1,
wherein said data processing device is configured as an integrated circuit.

12. A data processing device which compresses image data, said data processing device comprising:
an input unit configured to acquire image data
a meaning information extraction unit configured to extract meaning information indicating a feature of an object image included in an image represented by the image data
a compression specifying unit configured to determine an initial value of a compression ratio which indicates a level of compression efficiency;
a compression unit configured to compress the image data according to the initial value of the compression ratio determined by said compression specifying unit to generate compressed image data; and
a determination unit configured to determine whether or not the meaning information extracted by said meaning information extraction unit can be extracted from the compressed image data generated by said compression unit,
wherein said compression specifying unit is further configured to change the compression ratio from the initial value according to a result of the determination by said determination unit,
when said compression specifying unit changes the compression ratio, said compression unit is further configured to compress the image data according to the changed compression ratio to newly generate compressed image data,
when said meaning information extraction unit extracts plural items of the meaning information, said compression specifying unit is configured to select focus meaning information from the items of the meaning information based on an area of an object image corresponding to each of the items of meaning information,
said determination unit is configured to determine whether or not the focus meaning information can be extracted from the compressed image data generated by said compression unit, and
when said meaning information extraction unit extracts the plural items of the meaning information, said compression specifying unit is configured to select, as the focus meaning information, an item of the meaning information for which a proportion of the area is smallest, from among the plural items of the meaning information for each of which a proportion of the area of the corresponding object to an area of the image represented by the image data is equal to or larger than a threshold.

13. A data processing device which compresses image data, said data processing device comprising:

an input unit configured to acquire image data;

a meaning information extraction unit configured to extract meaning information indicating a feature of an object image included in an image represented by the image data a compression specifying unit configured to determine an initial value of a compression ratio which indicates a level of compression efficiency;

a compression unit configured to compress the image data according to the initial value of the compression ratio determined by said compression specifying unit to generate compressed image data;

a determination unit configured to determine whether or not the meaning information extracted by said meaning information extraction unit can be extracted from the compressed image data generated by said compression unit;

a meaning information storage unit storing meaning information; and a similarity determination unit configured to calculate a similarity that indicates similarity between the meaning information extracted by said meaning information extraction unit and the meaning information stored in said meaning information storage unit, wherein said compression specifying unit is further configured to change the compression ratio from the initial value according to a result of the determination by said determination unit, when said compression specifying unit changes the compression ratio, said compression unit is further configured to compress the image data according to the changed compression ratio to newly generate compressed image data, when said meaning information extraction unit extracts plural items of the meaning information, said compression specifying unit is configured to select focus meaning information from the items of meaning information based on the similarity calculated by said similarity determination unit, said determination unit is configured to determine whether or not the focus meaning information can be extracted from the compressed image data generated by said compression unit, and said compression specifying unit is configured to select, as the focus meaning information, an item of the meaning information for which the similarity calculated by said similarity determination unit is largest, from among the items of the meaning information.

14. A data processing device which compresses image data, said data processing device comprising:

an input unit configured to acquire image data a meaning information extraction unit configured to extract meaning information indicating a feature of an object image included in an image represented by the image data;

a compression specifying unit configured to determine an initial value of a compression ratio which indicates a level of compression efficiency;

a compression unit configured to compress the image data according to the initial value of the compression ratio determined by said compression specifying unit to generate compressed image data;

a determination unit configured to determine whether or not the meaning information extracted by said meaning information extraction unit can be extracted from the compressed image data generated by said compression unit;

a meaning information storage unit storing meaning information; and a similarity determination unit configured to calculate a similarity that indicates similarity between the meaning information extracted by said meaning information extraction unit and the meaning information stored in said meaning information storage unit, wherein said compression specifying unit is further configured to change the compression ratio from the initial value according to a result of the determination by said determination unit, when said compression specifying unit changes the compression ratio, said compression unit is further configured to compress the image data according to the changed compression ratio to newly generate compressed image data, when said meaning information extraction unit extracts plural items of the meaning information, said compression specifying unit is configured to select focus meaning information from the items of meaning information based on the similarity calculated by said similarity determination unit, said determination unit is configured to determine whether or not the focus meaning information can be extracted from the compressed image data generated by said compression unit, and said compression specifying unit is configured to select, as the focus meaning information, an item of the meaning information for which a proportion of an area of an object image corresponding to the item to an area of the image represented by the image data is smallest, from among the items of the meaning information for each of which the similarity calculated by said similarity determination unit is equal to or larger than a threshold.

15. A data processing device which compresses image data, said data processing device comprising:

an input unit configured to acquire image data a meaning information extraction unit configured to extract meaning information indicating a feature of an object image included in an image represented by the image data a compression specifying unit configured to determine an initial value of a compression ratio which indicates a level of compression efficiency;

a compression unit configured to compress the image data according to the initial value of the compression ratio determined by said compression specifying unit to generate compressed image data;

a determination unit configured to determine whether or not the meaning information extracted by said meaning information extraction unit can be extracted from the compressed image data generated by said compression unit;

a meaning information storage unit storing meaning information; and a similarity determination unit configured to calculate a similarity that indicates similarity between the meaning information extracted by said meaning information extraction unit and the meaning information stored in said meaning information storage unit, wherein said compression specifying unit is further configured to change the compression ratio from the initial value according to a result of the determination by said determination unit, when said compression specifying unit changes the compression ratio, said compression unit is further configured to compress the image data according to the changed compression ratio to newly generate compressed image data, when said meaning information extraction unit extracts plural items of the meaning information, said compression specifying unit is configured to select focus meaning information from the items of meaning information based on the similarity calculated by said similarity determination unit, said determination unit is configured to determine whether or not the focus meaning information can be extracted from the compressed image data generated by said compression unit, said meaning information storage unit is further configured to store frequencies of extraction in association with the respective items of meaning information, the frequencies of extraction each indicating the number of times of extraction performed by said meaning information extraction unit, said data processing device further comprises a ranking management unit configured to calculate ranks which indicate significance of the respective items of meaning information based on the frequencies of extraction stored in said meaning information storage unit, and said compression specifying unit is configured to acquire the ranks calculated by said ranking management unit and associated with the respective items of meaning information extracted by said meaning information extraction unit, and determine the initial value of the compression ratio based on the acquired ranks.

16. A data processing method of compressing image data, said method comprising:

acquiring image data;

extracting meaning information indicating a feature of an object image included in an image represented by the image data;

determining an initial value of a compression ratio which indicates a level of compression efficiency;

compressing the image data according to the initial value of the compression ratio determined in said determining to generate compressed image data; and determining whether or not the meaning information extracted in said extracting can be extracted from the compressed image data generated in said compressing, wherein, in said determining of an initial value of a compression ratio, the compression ratio is further changed from the initial value according to a result of determination in said determining whether or not the meaning information can be extracted, and when the compression ratio is changed in said determining an initial value of a compression ratio, the image data is further compressed in said compressing according to the changed compression ratio to newly generate compressed image data, when plural items of the meaning information are extracted in said extracting, said data processing method further comprises selecting focus meaning information from the items of the meaning information based on an area of an object image corresponding to each of the items of meaning information, said data processing method further comprises determining whether or not the focus meaning information can be extracted from the compressed image data generated in said compressing, and when the plural items of the meaning information are extracted in said extracting, said selecting focus meaning information further comprises selecting, as the focus meaning information, one of the items of meaning information for which a proportion of the area of the corresponding object image to an area of the image represented by the image data is largest.

17. A non-transitory computer-readable medium having a program stored thereon which causes a computer to execute the data processing method according to claim 16.

* * * * *